(12) United States Patent
Tabuki

(10) Patent No.: US 12,547,405 B2
(45) Date of Patent: Feb. 10, 2026

(54) IMAGE PROCESSING APPARATUS CAPABLE OF COMMUNICATING WITH AN INFORMATION PROCESSING APPARATUS HAVING A CHAT SERVICE, AND STORAGE MEDIUM THEREFOR

(71) Applicant: CANON KABUSHIKI KAISHA, Tokyo (JP)

(72) Inventor: Masumi Tabuki, Oita (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 17/935,064

(22) Filed: Sep. 23, 2022

(65) Prior Publication Data

US 2023/0101232 A1 Mar. 30, 2023

(30) Foreign Application Priority Data

Sep. 27, 2021 (JP) ................................ 2021-156315

(51) Int. Cl.
| | |
|---|---|
| *G06F 15/00* | (2006.01) |
| *G06F 9/30* | (2018.01) |
| *G06T 7/80* | (2017.01) |
| *H04L 51/04* | (2022.01) |

(52) U.S. Cl.
CPC .............. *G06F 9/3009* (2013.01); *G06T 7/80* (2017.01); *H04L 51/04* (2013.01)

(58) Field of Classification Search
None
See application file for complete search history.

(56) References Cited

U.S. PATENT DOCUMENTS

| | | | |
|---|---|---|---|
| 11,350,000 B2 | 5/2022 | Tsukada | |
| 11,399,116 B2* | 7/2022 | Hasegawa | H04N 1/00811 |
| 2020/0286234 A1* | 9/2020 | Ichinose | G16H 50/20 |
| 2021/0144266 A1* | 5/2021 | Tsukada | H04N 1/00411 |
| 2021/0160393 A1* | 5/2021 | Sugita | H04N 1/00472 |
| 2021/0195060 A1* | 6/2021 | Hasegawa | H04N 1/00411 |
| 2021/0195061 A1* | 6/2021 | Moriya | G06F 21/608 |
| 2021/0266421 A1* | 8/2021 | Osuki | H04L 51/046 |
| 2021/0409556 A1* | 12/2021 | Ushinohama | H04N 1/00212 |
| 2022/0256042 A1 | 8/2022 | Tsukada | |
| 2023/0058537 A1* | 2/2023 | Yamamoto | H04N 1/32101 |

FOREIGN PATENT DOCUMENTS

| | | |
|---|---|---|
| JP | 2021078084 A | 5/2021 |
| JP | 2023027466 A | 3/2023 |

\* cited by examiner

*Primary Examiner* — Mark R Milia
(74) *Attorney, Agent, or Firm* — Canon U.S.A., Inc. IP Division

(57) ABSTRACT

An image processing apparatus capable of communicating with an information processing apparatus includes a reading unit that reads an image of a document and generates image data, a transmission unit that transmits the image data, and a reception unit that receives an instruction from the information processing apparatus. Based on the received instruction, the reading unit reads the image of the document and generates the image data and the transmission unit transmits the generated image data to the information processing apparatus. The image data transmitted by the transmission unit is posted to a thread specified by a user via a terminal apparatus connected to the information processing apparatus, the thread being one of at least one thread included in a channel of a chat service provided by the information processing apparatus.

12 Claims, 23 Drawing Sheets

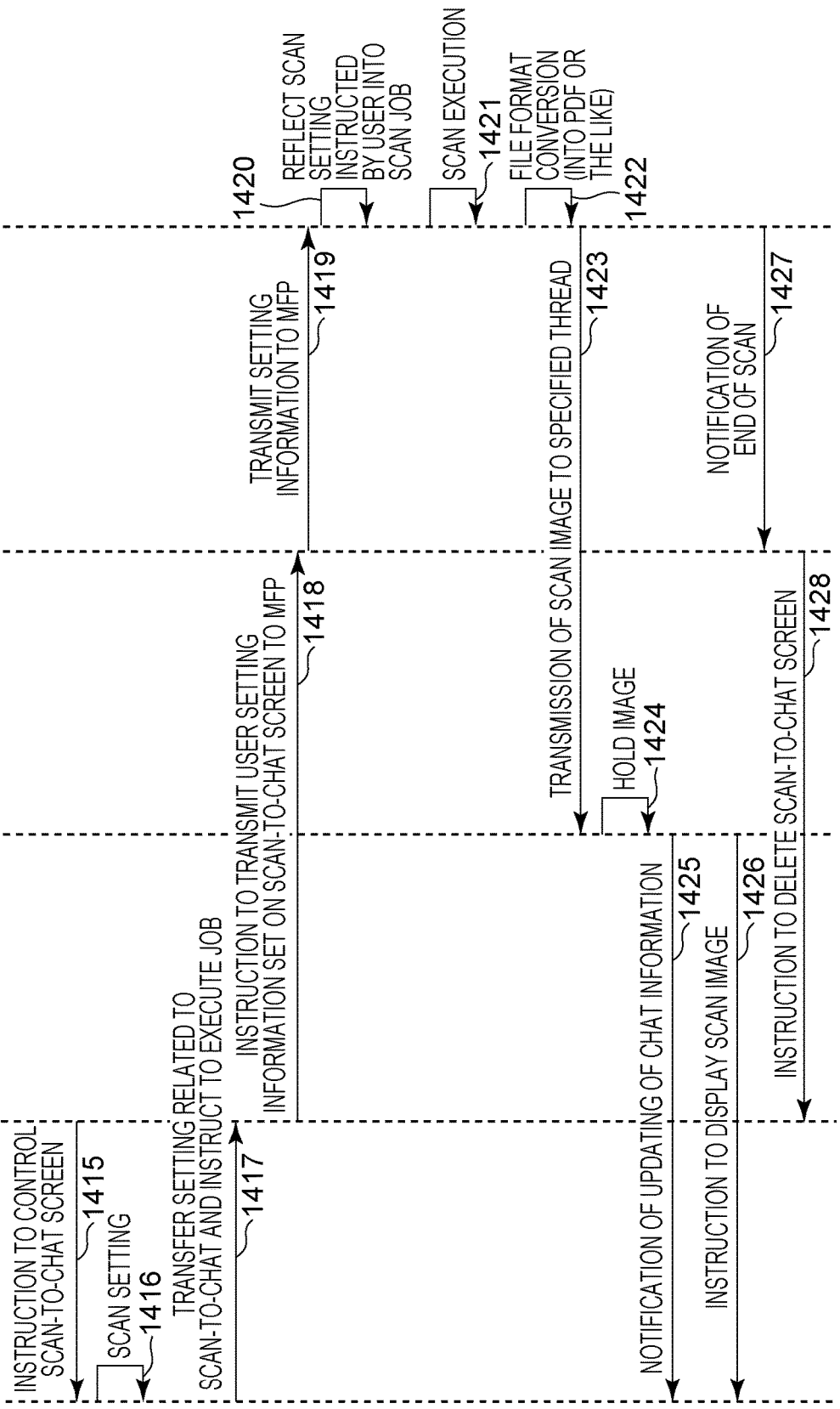

IMAGE PROCESSING APPARATUS CAPABLE OF COMMUNICATING WITH AN INFORMATION PROCESSING APPARATUS HAVING A CHAT SERVICE, AND STORAGE MEDIUM THEREFOR

BACKGROUND

Field

The present disclosure relates to an image processing apparatus, an image processing method, and a storage medium.

Description of the Related Art

Japanese Patent Laid-Open No. 2021-78084 discloses that an image processing apparatus transmits image data generated by scanning an image of a document to a chat server that provides a chat service.

As a result, the image data is uploaded to a talk room of the chat service and the image data is shared.

On the talk room of the chat service, a plurality of chats are grouped in threads for each series of conversations. Each user chats using a different thread for each topic, and thus it is possible to check a series of conversations in a lump.

In the technique disclosed in Japanese Patent Laid-Open No. 2021-78084, it is not known which thread on the talk room the image data generated by the image processing apparatus by scanning the image of the document is uploaded to, and thus there is a possibility that the image data is uploaded to a thread that is not intended by the user. In a case where the user specifies a thread, it is desirable that the specifying can be performed by an operation which is an extension of the chat operation.

SUMMARY OF THE INVENTION

In view of the above, the present disclosure provides a technique that enables a user to easily upload image data generated by an image processing apparatus by reading an image of a document to a desired thread.

According to an aspect, the present disclosure provides an image processing apparatus capable of communicating with an information processing apparatus, the image processing apparatus including a reading unit configured to read an image of a document and generate image data, a transmission unit configured to transmit the image data, and a reception unit configured to receive an instruction from the information processing apparatus, wherein based on the received instruction, the reading unit reads the image of the document and generates the image data and the transmission unit transmits the generated image data to the information processing apparatus, wherein the image data transmitted by the transmission unit is posted to a thread specified by a user via a terminal apparatus connected to the information processing apparatus, the thread being one of at least one thread included in a channel of a chat service provided by the information processing apparatus.

Further features of the present disclosure will become apparent from the following description of exemplary embodiments with reference to the attached drawings.

BRIEF DESCRIPTION OF THE DRAWINGS

FIG. 4 is a diagram showing an example of a hardware configuration of a terminal such as a mobile terminal, an information processing terminal, or the like.

FIGS. 16A and 16B are a sequence diagram showing an example of a scan-to-chat process.

DESCRIPTION OF THE EMBODIMENTS

Embodiments of the present disclosure are described below with reference to drawings. Note that the embodiments described below are provided for illustrating examples of the present disclosure, but the present disclosure is not limited to those embodiments described below with reference to the drawings.

Figure 1:
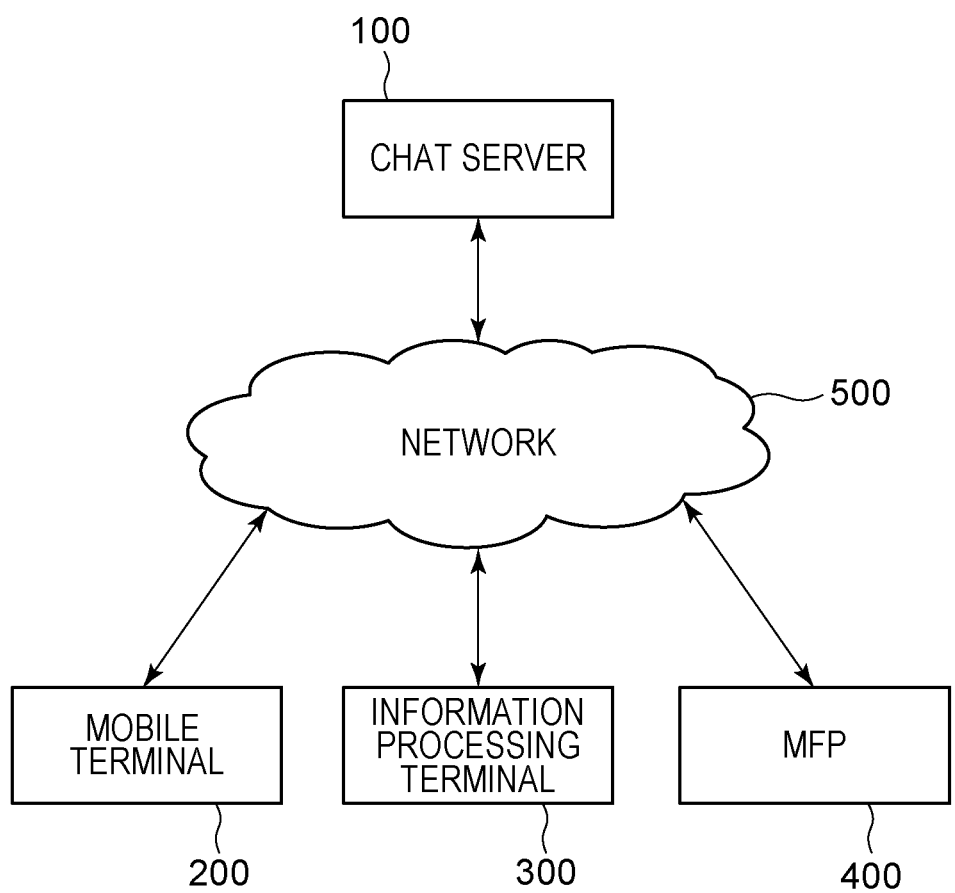
FIG. 1 is a diagram showing an example of a system configuration of a chat service.

FIG. 1 is a diagram showing an example of a system configuration of a chat service. In the present disclosure, the chat service includes a chat server 100, a mobile terminal 200, an information processing terminal 300, and an MFP (Multi Function Peripheral) 400, which are connected to a network 500. The chat server 100 is an information processing apparatus that provides a chat service. The chat server 100 communicates with a plurality of terminals via the network 500 and sends and receives chat information. The mobile terminal 200 and the information processing terminal 300, which are terminal apparatuses, access the chat server 100 via the network 500, display a UI for using the chat service, and upload a message, image data, or the like to the chat server 100. The MFP 400, which is an image processing apparatus, can receive a print job from the chat server, execute the print job, and send image data generated by a scanning operation to the chat server 100.

Figure 2:
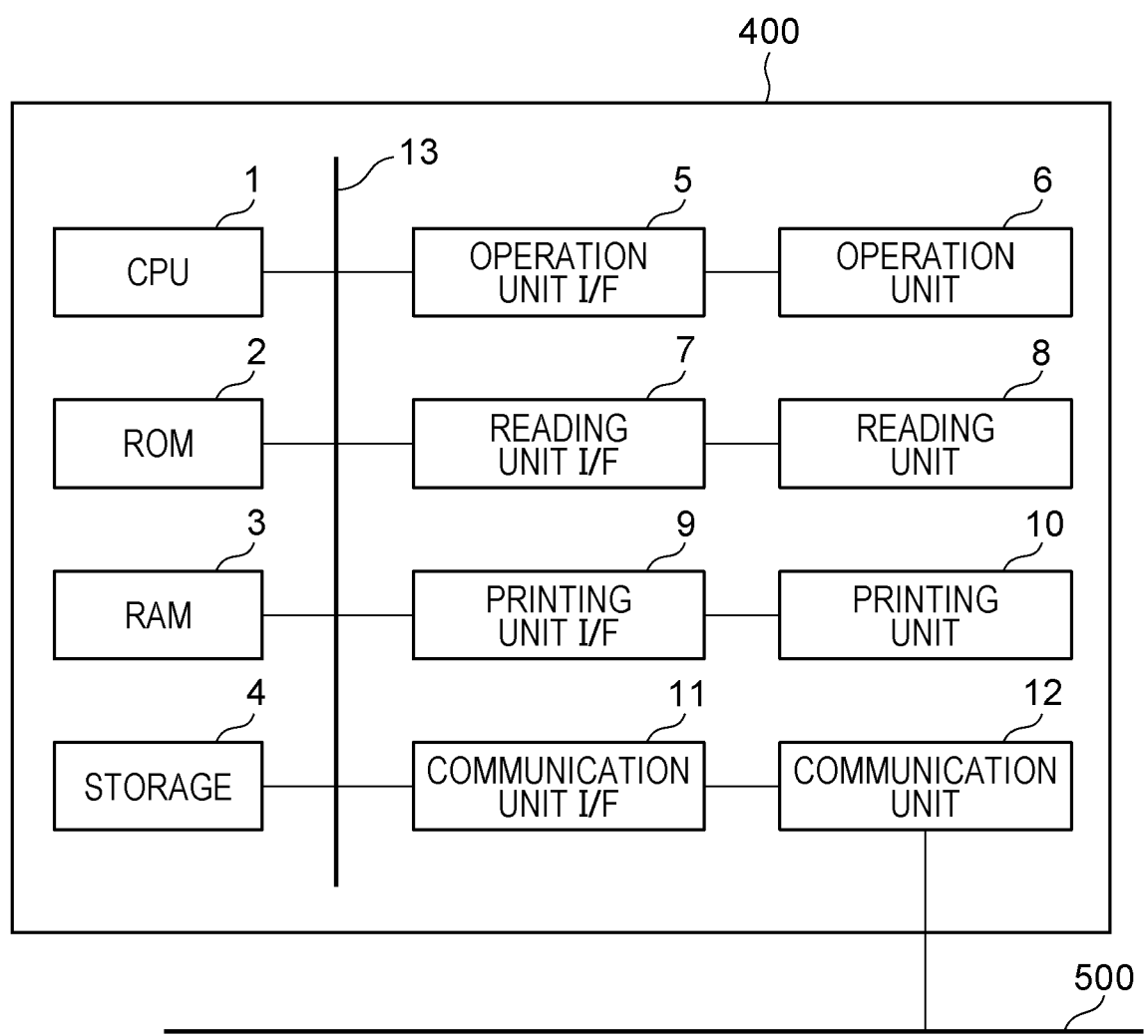
FIG. 2 is a diagram showing an example of a hardware configuration of an MFP.

FIG. 2 is a diagram showing an example of a hardware configuration of the MFP 400. The MFP 400 includes a CPU 1, a ROM 2, a RAM 3, a storage 4, an operation unit I/F 5, an operation unit 6, a reading unit I/F 7, a reading unit 8, a printing unit I/F 9, a printing unit 10, a communication unit I/F 11, and a communication unit 12.

Each of these units is controlled by the CPU 1 via a system bus 13.

The CPU 1 loads a control program from the ROM 2 or the storage 4 into the RAM 3 and executes it performing various controls such as a read control and a print control. The ROM 2 stores the control program that can be executed by the CPU 1. The ROM 2 also stores a boot program, font data, or the like. The RAM 3 is a main storage memory, and is used as a work area and a temporary storage area for loading various control programs from the ROM 2 or the storage 4. The storage 4 stores image data, print data, various programs, various addresses, and various kinds of setting information. Examples of media usable as the storage 4 include auxiliary storage devices such as an SSD (Solid State Drive), an HDD (Hard Disk Drive), or the like, and an eMMC (embedded Multi Media Card) or the like.

In the MFP 400 according to the present embodiment, it is assumed by way of example that one CPU 1 performs, using one memory (RAM 3), various processes described below with reference to the illustrated flowcharts. However, the MFP 400 is not limited to this configuration. In another exemplary embodiment, for example, processes can be executed by a plurality of CPUs in cooperation with a plurality of RAMs, ROMs, and storages. In another exemplary embodiment, a hardware circuit such as an ASIC, an FPGA, or the like can be used to execute a part of the processes.

The operation unit I/F 5 connects the CPU 1 with the operation unit 6 including a hard key and a display unit such as a touch panel. The operation unit 6 functions as both a display unit that displays information to a user and an operation unit that detects an input provided by the user.

The reading unit I/F 7 connects the reading unit 8, which can be a scanner or the like, with the CPU 1. The reading unit 8 reads an image of a document, and the CPU 1 converts the read image into image data such as binary data. The image data generated based on the read image is transmitted to an external apparatus or is printed on a printing recording medium.

The printing unit I/F 9 connects the printing unit 10, which can be a printer or the like, with the CPU 1. The CPU 1 transfers the image data (print data) stored in the RAM 3 to the printing unit 10 via the printing unit I/F 9. The printing unit 10 prints an image on a printing recording medium fed from a cassette based on the transferred image data.

The communication unit I/F 11 connects the CPU 1 with the network 500. The communication unit I/F 11 is used by the communication unit 12 to transmit image data or various kinds of information related to the apparatus to an external apparatus on the network 500 or to receive print data from an information processing apparatus on the network 500 or information on the network 500. A method of transmission/reception via the network 500 is to perform transmission/reception using e-mail or to transmit/receive a file using a protocol (for example, FTP, SMB, WEBDAV, etc.). Image data and/or various kinds of setting data can be transmitted/received via the network 500 by accessing, from the mobile terminal 200 or the chat server 100, using HTTP communication.

Figure 3:
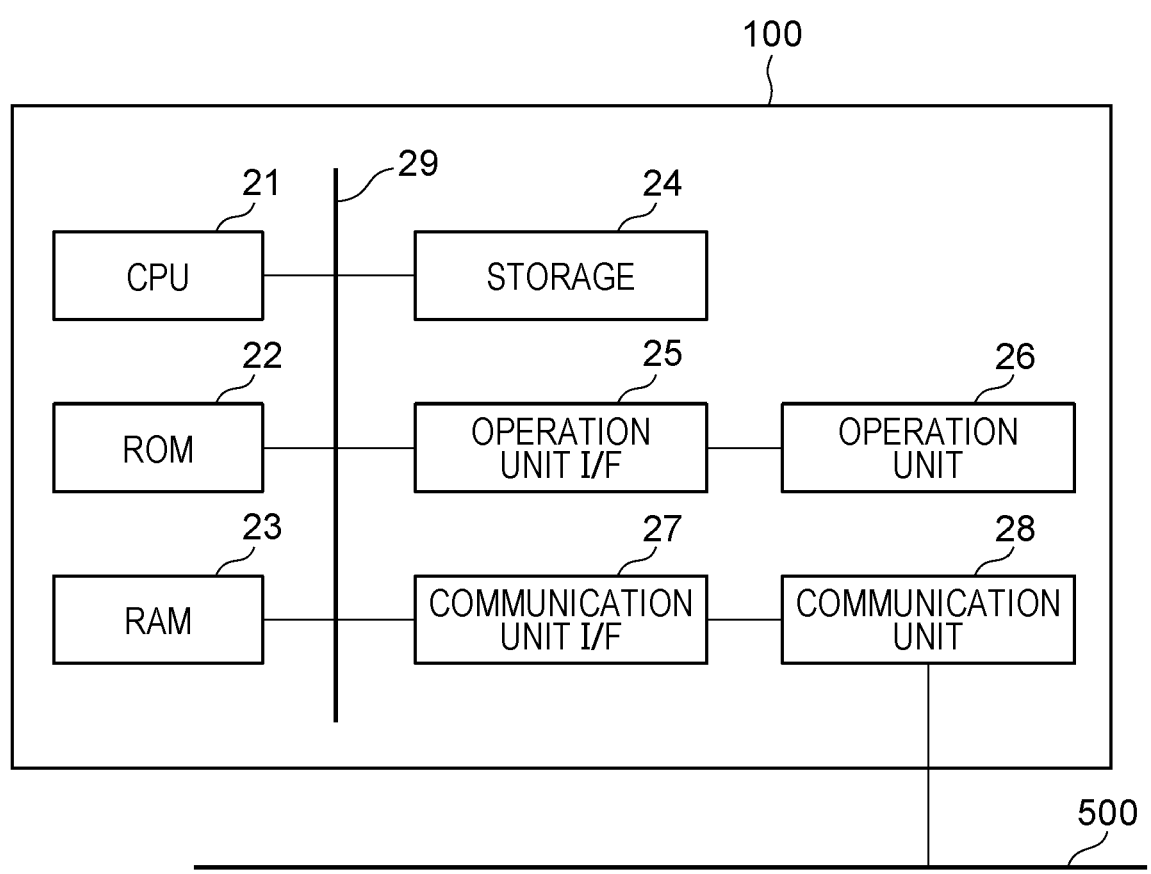
FIG. 3 is a diagram showing an example of a hardware configuration of a chat server.

FIG. 3 is a diagram showing an example of a hardware configuration of the chat server 100. A CPU 21 reads out a control program from a ROM 22 and executes it to perform various processes for controlling the operation of the chat server 100. The ROM 22 stores the control program. A RAM 23 is used by the CPU 21 as a main memory, a work area, or a storage area for temporarily storing information.

A storage 24 stores chat messages, image data, and various chat-related information.

An operation unit I/F 25 controls an operation unit 26 including a hard key and a display unit such as a touch panel. An operation unit 26 displays, for example, information to a server administrator and receives various kinds of setting information from the server administrator.

A communication unit I/F 27 performs data communication with the network 500 by controlling a communication unit 28.

The communication unit 28 transmits/receives data to/from various apparatuses such as the mobile terminal 200, the information processing terminal 300, the MFP 400, or the like via the network 500.

Figure 4:
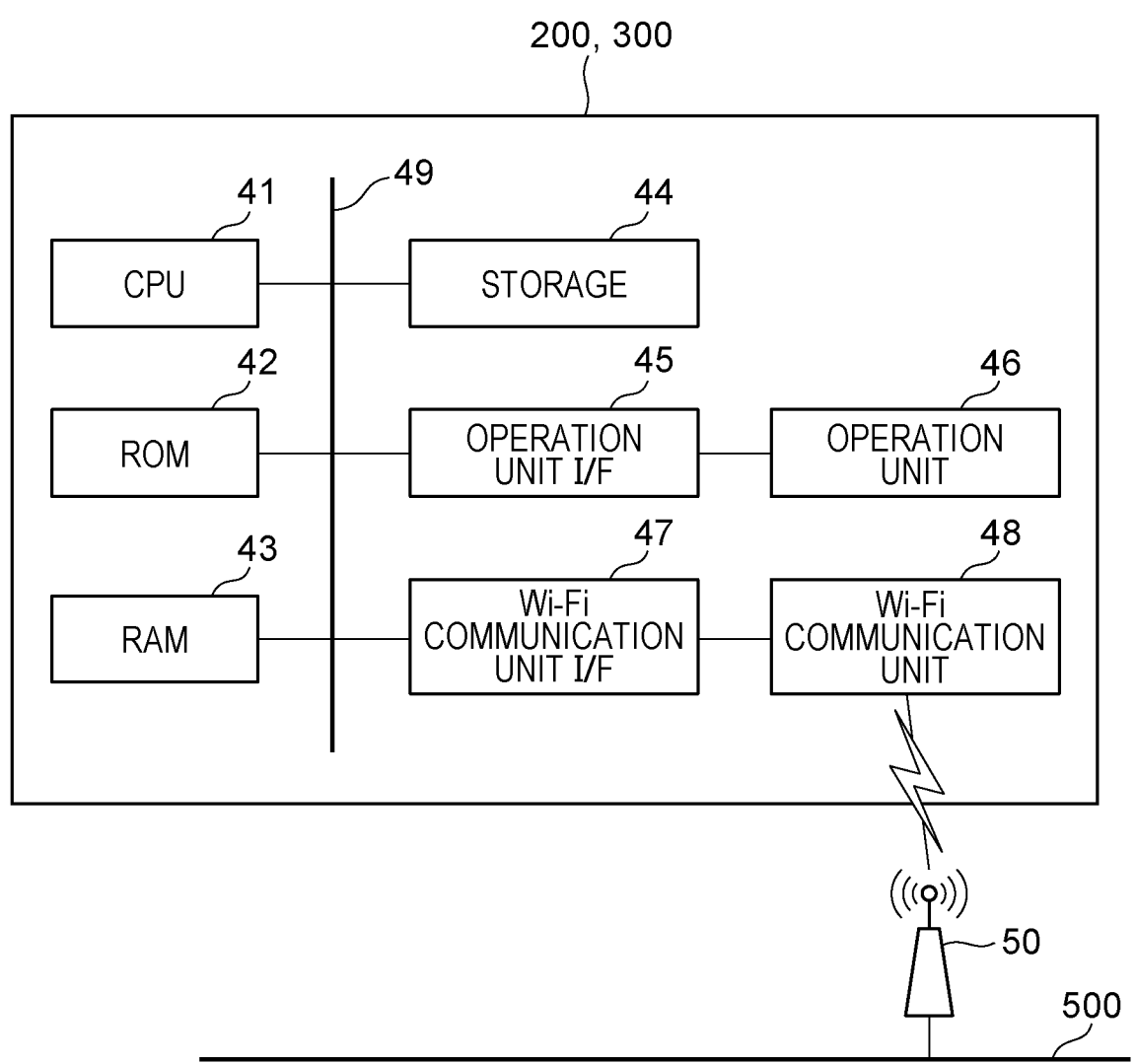

FIG. 4 is a diagram showing an example of a hardware configuration of a terminal such as the mobile terminal 200, the information processing terminal 300, or the like.

A CPU 41 reads out a control program from a ROM 42 and executes it to perform various processes for controlling the operation of the respective terminal. The ROM 42 stores various control programs necessary for controlling the respective terminal. A RAM 43 is used by the CPU 41 as a main memory, a work area, or a storage area for temporarily storing information. The storage 44 stores an application program running on a respective terminal and various kinds of data generated by each application.

An operation unit I/F 45 controls an operation unit 46 including a hard key and a display unit such as a touch panel. The operation unit 46 displays information to a user who operates a respective terminal and receives a content instructed by the user, or the like. In the present embodiment, the operation unit 46 is also used to display a chat message or an attached file which is transmitted/received between the respective terminal and the chat server 100.

A communication unit I/F 47 performs data communication with the network 500 by controlling a communication unit 48. The communication unit 48 transmits/receives data to/from various apparatuses such as the chat server 100, the MFP 400, or the like via the network 500.

In the present embodiment, it is assumed by way of example that the communication unit 48 communicates with the network 500 via a wireless access point 50 using a wireless network connection by Wi-Fi®. However, other wireless communication methods, such as LTE or the like, can be used.

Figure 5:
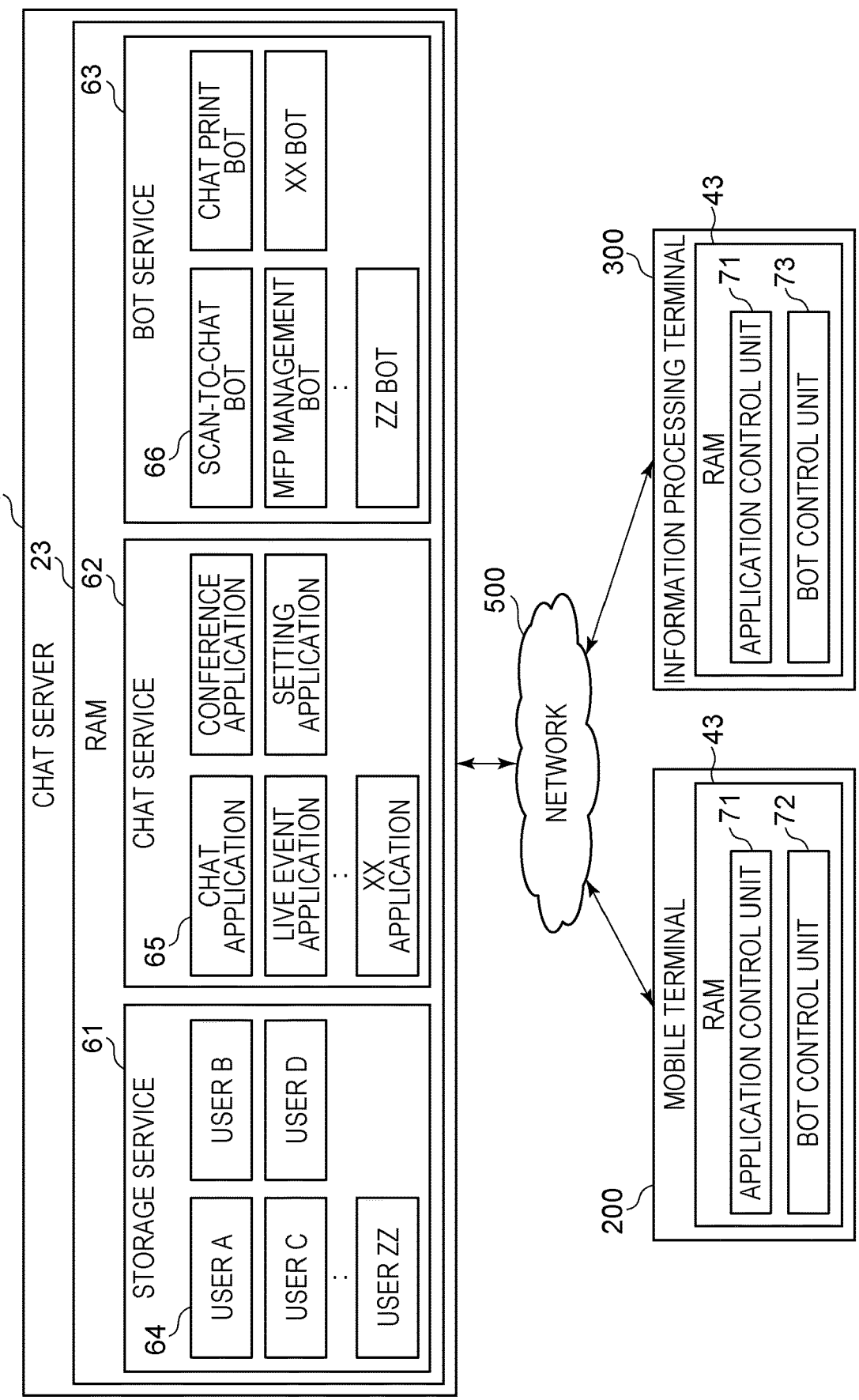
FIG. 5 is a diagram showing an example of a configuration of chat-related software that operates on a chat server and a mobile terminal.

FIG. 5 is a diagram showing an example of a configuration of chat-related software that operates on the chat server 100, the mobile terminal 200, and the information processing terminal 300.

In the present embodiment, three services including a storage service 61, a chat service 62, and a BOT service 63 are operating on the RAM 23 of the chat server 100.

The information in the RAM 23 is appropriately read and written into the storage 24 such that no data difference occurs between the RAM 23 and the storage 24.

In the storage service 61, a storage area is allocated for each user using the chat service provided by the chat server 100. In the example shown in FIG. 5, storage areas are respectively allocated for a user A 64, a user B, a user C, a user D, . . . a user ZZ.

The chat service 62, includes an application for each of the various services provided by the chat server 100. The applications perform various controls necessary for providing the various services.

In the present embodiment, each application of the chat service 62 is controlled by an application control unit 71 of the respective terminal (the mobile terminal 200 or the information processing terminal 300 shown in FIG. 1), and performs processing on an input/output from/to the user.

In the present embodiment, a chat application 65 controls a one-to-one chat for each individual and a group chat for a plurality of people. In these chats, each message is managed in units of threads. In addition, creating of a new thread, separating of a message in a thread into another thread, or the like are also controlled by the chat application 65. A thread is a collection of a plurality of chats performed in series. By managing messages in units of threads in the above-described manner, users can easily identify which topic a message belongs to, and can browse only topics of interest, which makes it possible to perform communication in an efficient manner.

In FIG. 5, a conference application is an application for performing a Web conference. The conference application performs various controls necessary for an online meeting in terms of, for example, a meeting time adjustment, screen sharing, file sharing, or the like.

In FIG. 5, a live event application performs various controls necessary for a presenter to send information in a one-way manner.

In FIG. 5, a setting application performs various controls necessary for performing various settings related to the chat service, for example, setting of personal information, personalization, or the like.

The BOT service 63 provides a robot (a program) (BOT) that automates a specific operation in cooperation with the chat service 62. In each BOT in the BOT service 63, each application of the chat service 62 activates a BOT selected by a user and performs various controls. In the present embodiment, each BOT of the BOT service 63 performs various controls necessary for automation in cooperation with the BOT control unit 73 of a respective terminal (the mobile terminal 200 or the information processing terminal 300 shown in FIG. 1).

In FIG. 5, a scan-to-chat BOT 66 is a BOT that automates a process, on the MFP 400, from scanning (reading) a document to transmitting a chat. The process performed by the scan-to-chat BOT 66 includes control of inputting/outputting information necessary in automating the series of operations such as making various settings for scanning, formatting a digital electronic file converted from scanned data, specifying a destination of a reply, or the like.

In FIG. 5, a chat print BOT is a BOT that automates an operation of instructing the MFP 400 to print information exchanged in a chat. The automated operation includes control of inputting/outputting in terms of selecting a message to be printed, selecting a file to be attached, selecting a file to be shared, specifying the number of copies to be printed, specifying single-sided/both-sided printing, and the like.

In FIG. 5, an MFP management BOT is a BOT that manages an operation state or the like of the MFP 400. More specifically, the MFP management BOT controls automating of an operation of issuing an instruction related to recovery from an issue that occurred in the MFP 400, handling running-out of consumables, or the like.

The application control unit 71 and the BOT control unit 72 are stored in the RAM 43 of the mobile terminal 200 such that the chat services according to the present disclosure are provided by cooperation between the two control units. The application control unit 71 downloads a program from the chat service 62 of the chat server 100 and executes it to perform various controls for providing functions to a user.

The BOT control unit 72 downloads a program from the BOT service 63 of the chat server 100 and executes it to perform various controls for providing various BOT functions to the user.

In the present embodiment, downloaded programs provide various functions by controlling WebAPI provided by REST (Representational State Transfer), which is described below, by the chat service 62 and the BOT service 63 of the chat server 100.

Figure 6:
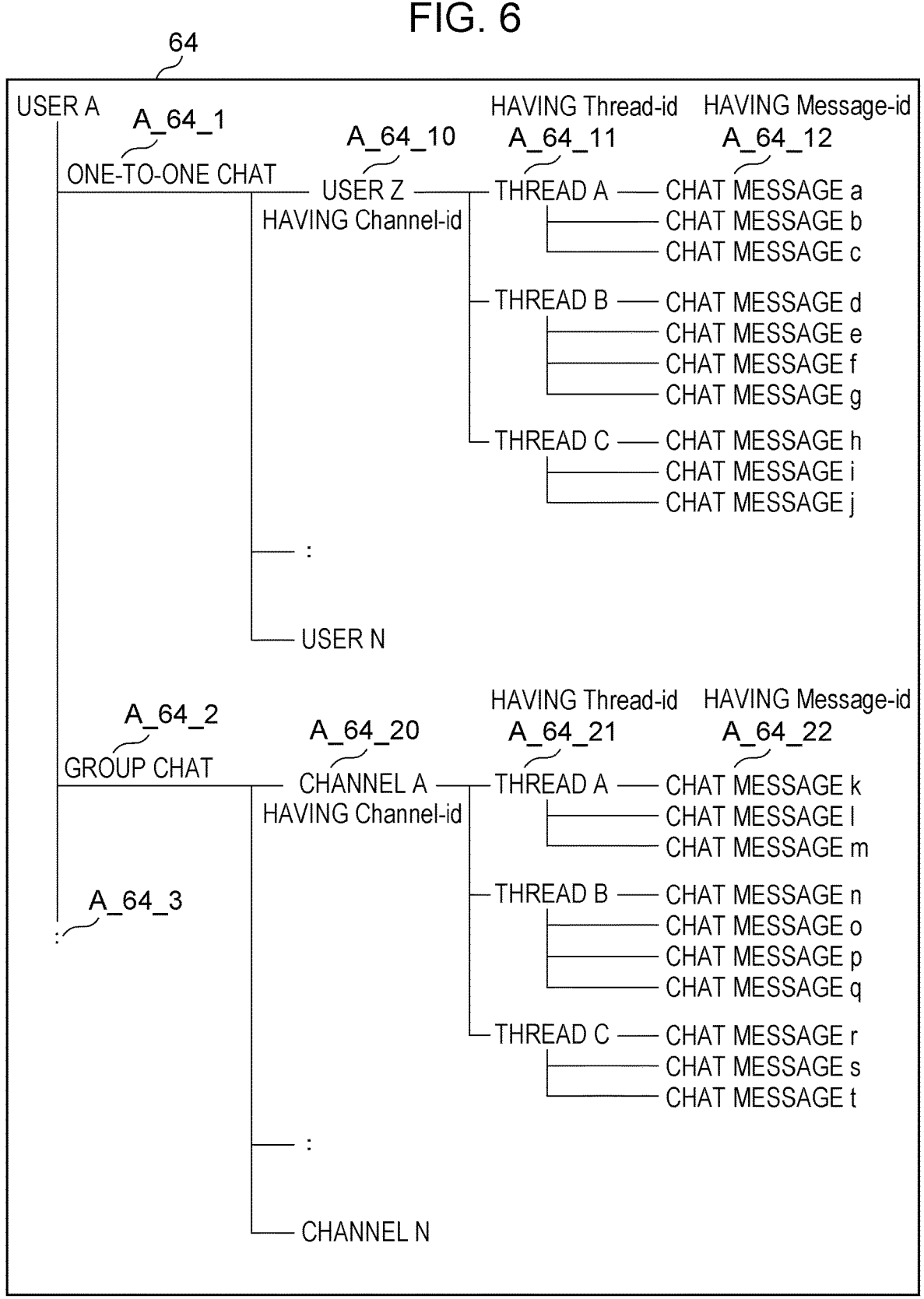
FIG. 6 is a diagram showing an example of information related to a user stored in a chat server.

FIG. 6 is a diagram showing an example of information related to a user A stored in the chat server.

The information related to the user A 64 is first stored separately for each chat service 62 being used. In the example shown in FIG. 6, the information is divided into information related to a one-to-one chat (A_64_1), a group chat (A_64_2), and others (marked by " . . . " (A_64_3)).

The information related to the one-to-one chat (A_64_1) is stored separately for each user (A_64_10) with whom the user A is individually chatting with. In the example shown in FIG. 6, there are users Z to N with whom the user A has individual chats.

The information related to the one-to-one chat (A_64_1) with the user Z is stored separately for each of threads (A_64_11) including thread A, thread B, and thread C.

In the thread A of the threads (A_64_11), chat messages (A_64_12) including three chat messages a to c are stored in chronological order of chat. Similarly, the thread B includes four chat messages, and the thread C includes three chat messages.

The group chat (A_64_2) of the user A 64 is branched into channels (A_64_20) each of which is a group including a plurality of users who communicate together at the same time. In the example shown in FIG. 6, the channels (A_64_20) include a plurality of groups.

The channel refers to a talk room (a chat room) in which a plurality of users participate. In each talk room, a plurality of users can exchange a message, a file, or the like with each other.

Each channel is configured to include one or more threads (A_64_21) and one or more chat messages (A_64_22) as with the one-to-one chat (A_64_1).

While details of A_64_3 are not described, information about chat services such as a conference, a live event, setting, or the like available in the chat service 62 shown in FIG. 5 is described in a similar manner to the user (A_64_10) and the channel (A_64_20).

Each of the channels A_64_10 and A_64_20 has a unique chat ID (Channel-id), and each of the threads A_64_11 and A_64_21 has a unique thread ID (Thread-id). Each of the messages A_64_12 and A_64_22 has a unique message ID (Message-id).

Each of these unique IDs has a uniquely identifiable value, which is managed by the storage service 61. When data is returned in response to a content request in process 1003 in FIG. 11, a unique ID is transmitted as information attached to a message or thread information to a terminal from the chat server 100.

Figure 7:
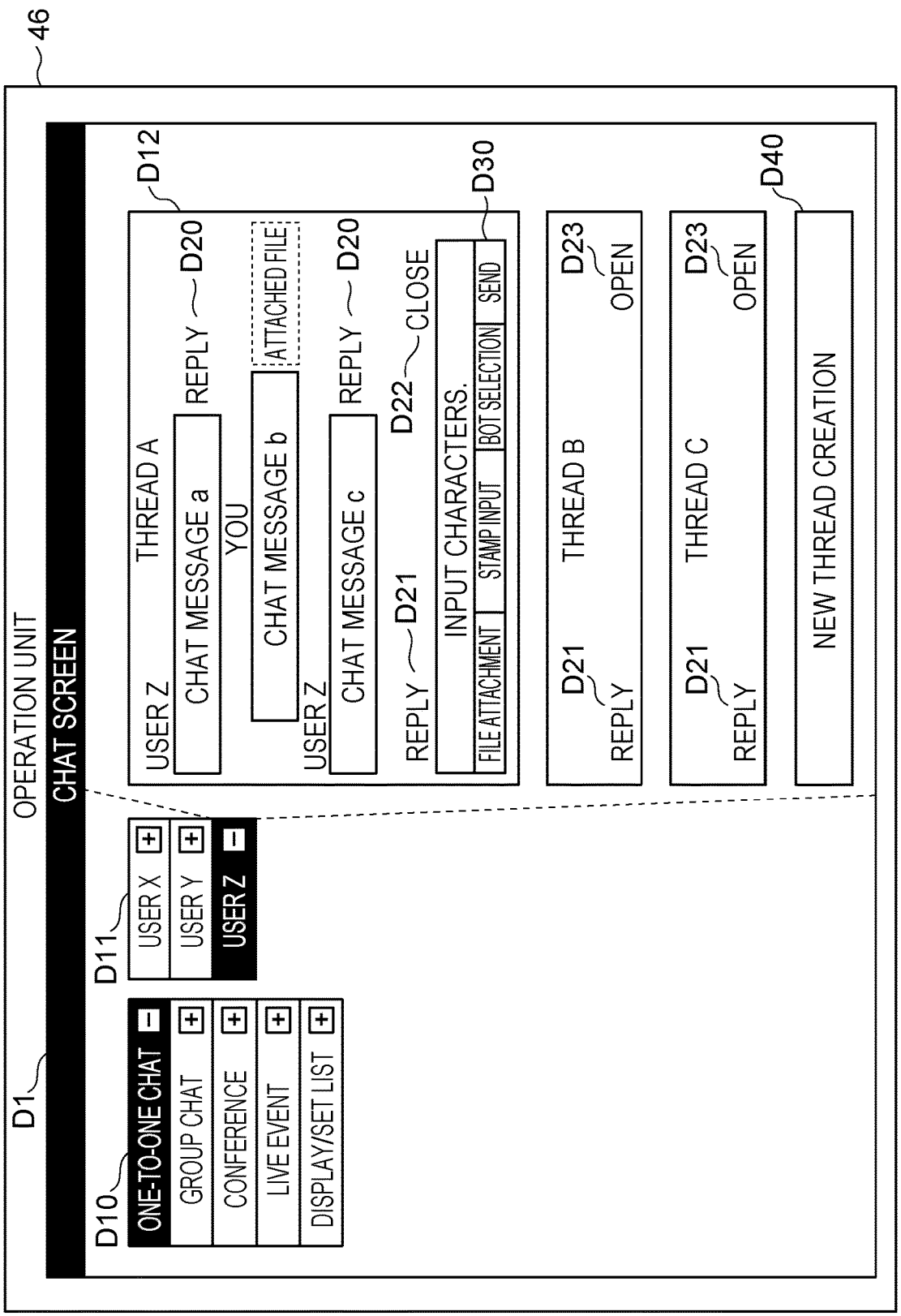
FIG. 7 is a diagram showing an example of a chat screen.

FIG. 7 is a diagram showing an example of a chat screen. The displayed information is obtained from the chat server 100 by the mobile terminal 200 by executing a sequence of processes described below with reference to FIG. 10, in cooperation with the chat application 65 and the application control unit 71.

In the chat screen D1 shown in FIG. 7, the user A 64 exchanges a chat message with a user Z in a thread A in a one-to-one chat (A_64_1). That is, the chat screen D1 is a screen for displaying a chat room.

In the chat screen D1, D10 is a section for displaying a list of services provided by the chat service 62, from which selecting a service such as the one-to-one chat, the group chat, or the like to use can be performed. In the example shown in FIG. 7, the one-to-one chat (A_64_1) is selected in the chat screen D10.

In the chat screen D1, D11 is a section for displaying a list of users (A_64_10) shown in FIG. 6. In the example shown in FIG. 7, the user Z is selected from the users (A_64_10).

In the chat screen D1, D12 is a section for displaying a list of threads (A_64_11) shown in FIG. 6. In the example shown in FIG. 7, chat messages exchanged in the thread A are displayed, while displaying chat messages in the threads B and C is omitted. In the chat screen D1, reply buttons D20 are buttons that are operated to reply to a corresponding chat message. In the present embodiment, when a reply button D20 is operated, the thread is automatically branched (i.e., a new thread is created) at a chat message corresponding to the operated reply button D20.

In the chat screen D1, reply buttons D21 are buttons that are operated to reply to a thread itself. The reply button D21 can be operated regardless of whether a chat message is displayed, as in the case of the thread A, or no message is displayed as in the case of the thread B or thread C.

A new thread creation button D40 in the chat screen D1 is a button for issuing an instruction to create a new thread. When the new thread creation button D40 is selected, a new thread is created and a chat message can be input. When one of the reply buttons D20, the reply buttons D21, and the new thread creation button D40 is operated, an edit field D30 for inputting a chat message is displayed. When a close button D22 is selected, the edit field D30 is hidden. In the example shown in FIG. 7, the reply button D21 corresponding to the thread D12 is selected and the edit field D30 is displayed. In the edit field D30, a file attachment button, a stamp input button, a BOT selection button, and a send button are displayed. When the file attachment button is selected, a file stored in the mobile terminal 200 is referred to and uploaded. When the stamp input button is selected, a selected stamp is posted. When the BOT selection button is selected, a screen for selecting a BOT application installed in the chat server 100 is displayed. When the send button is selected, entered characters are posted as a message. When an open button D23 is selected, all chat messages included in a target thread are displayed.

Figure 8:
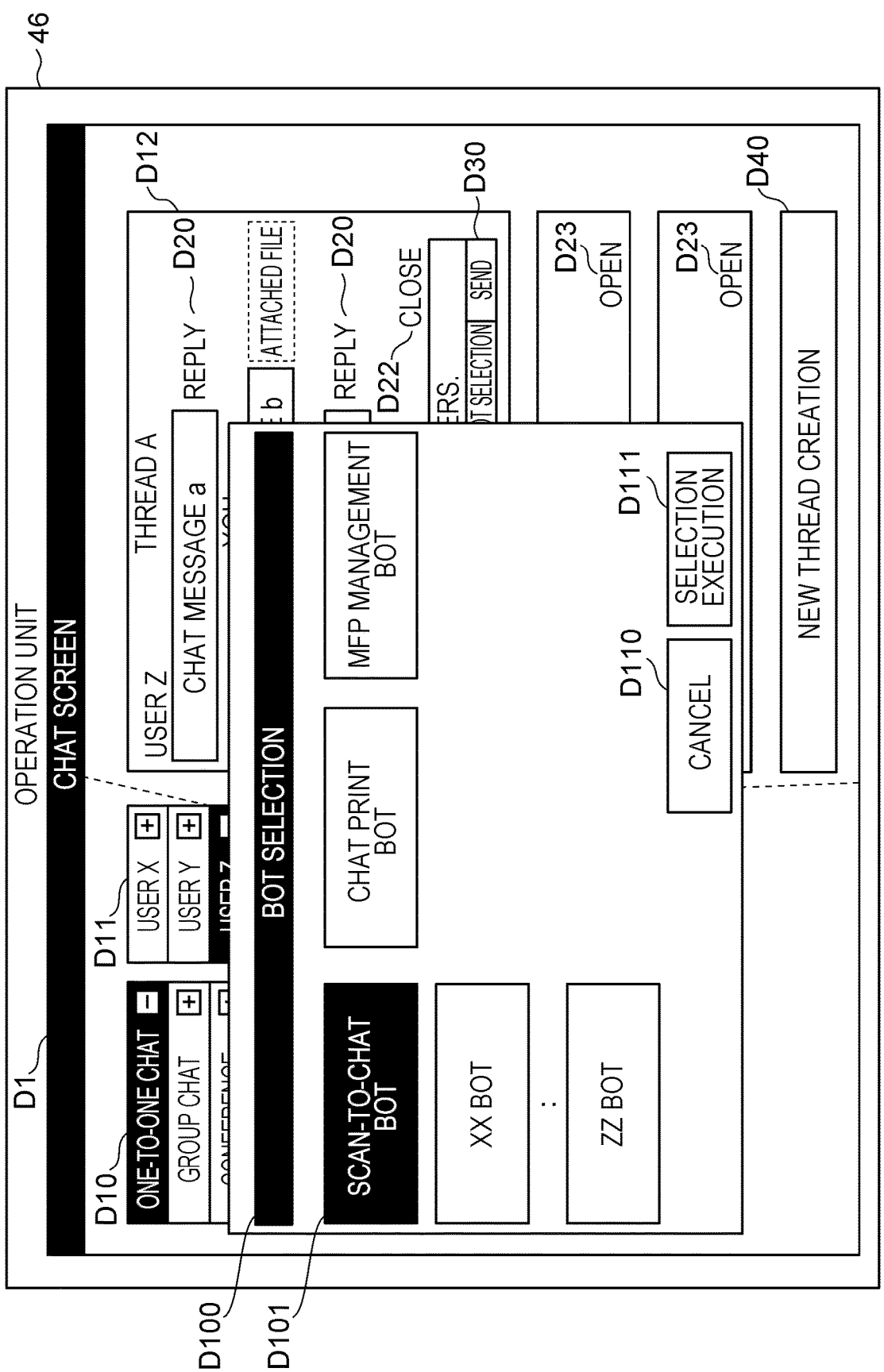
FIG. 8 is a diagram showing an example of a BOT selection screen.

FIG. 8 is a diagram showing an example of a BOT selection screen. When the BOT selection button is selected, a BOT selection screen D100 is displayed on the chat screen D1, and a list of BOTs supported by the BOT service 63 of the chat server 100 is displayed in the BOT selection screen D100.

Figure 9:
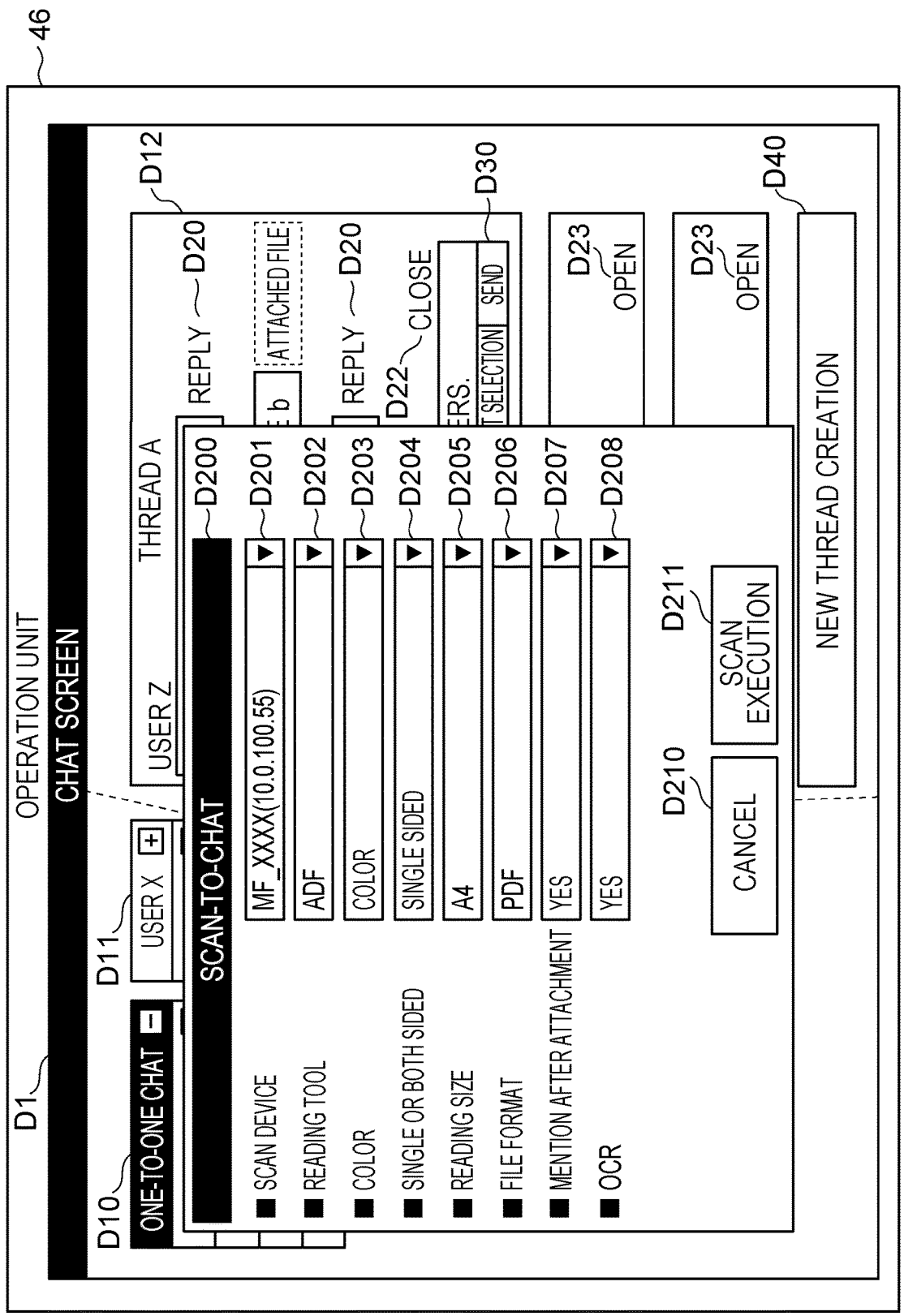
FIG. 9 is a diagram showing an example of a scan setting screen.

When a scan-to-chat BOT D101 is selected and a selection execution button D111 is selected, a scan setting screen shown in FIG. 9 is displayed.

FIG. 9 is a diagram showing an example of the scan setting screen. A scan-to-chat screen D200 is displayed on the chat screen D1. A pull-down menu D201 is for selecting an MFP to which a scan instruction is to be sent. A pull-down menu D202 is for selecting a reading unit. The reading unit can be an ADF (Automatic Document Feeder) or a flatbed platen of the MFP 400.

A pull-down menu D203 is for selecting a color from black and white, grayscale, and color. A pull-down menu D204 is for selecting a reading mode from one side, both sides (right/left side binding), and both sides (upper/lower side binding).

A pull-down menu D205 is for selecting a reading size. In the example shown in FIG. 9, scanning in A4 size is selected. A pull-down menu D206 is for selecting a file format in which image data is digitized and stored. In the example shown in FIG. 9, a PDF format is selected.

A pull-down menu D207 is for specifying whether mention (notification) is to be performed after the scan-to-chat process. When the mention is set to Yes, it is possible to specify a user to whom the mention is to be sent.

A pull-down menu D208 is for specifying whether to perform OCR processing on the scanned and digitized data. When a part obtained via the OCR processing includes character information, the character information is coded into a text format thereby acquiring the character information. In the case where the character information exists, a first few characters are automatically input in the chat message.

A cancel button D210 is operated to cancel a processing of interest. A scan execution button D211 is operated to transmit setting information selected by a pull-down menu to the MFP 400 selected by the pull-down menu D201 and instruct to execute a scan-to-chat process.

Figure 10:
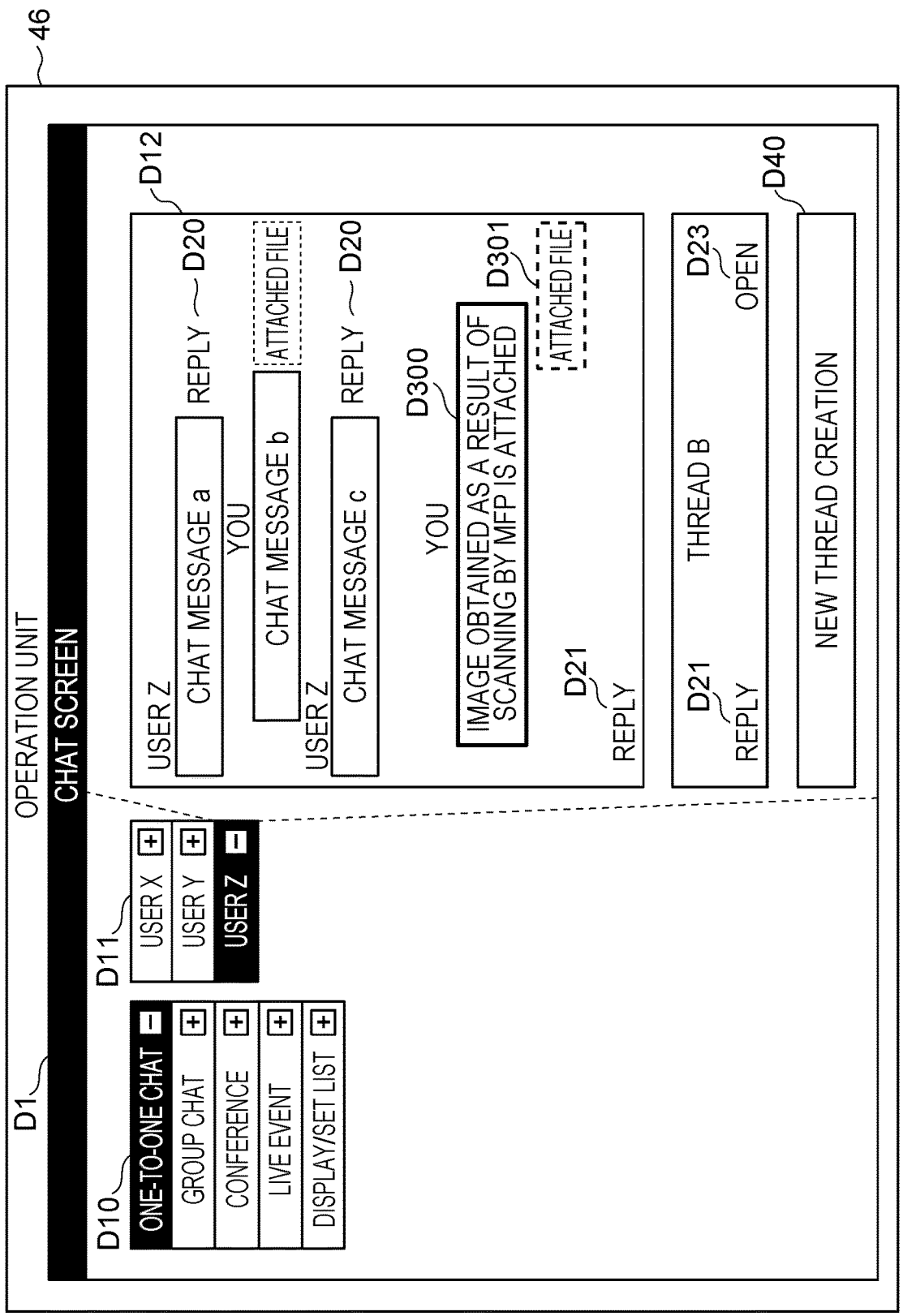
FIG. 10 is a diagram showing an example of a chat screen.

FIG. 10 is a diagram showing an example of a chat screen. D300 indicates a chat message posted as a result of executing the scan-to-chat process on the MFP 400. D301 denotes a file uploaded as a result of executing the scan-to-chat process by the MFP 400. The attached file has a file name whose extension is different depending on the file format specified by D206. File viewers (viewing software) for viewing files of the respective file formats indicated by the extensions can be provided on the mobile terminal 200 or the information processing terminal 300.

When the file D301 is selected, the file is downloaded or displayed.

Figure 11:
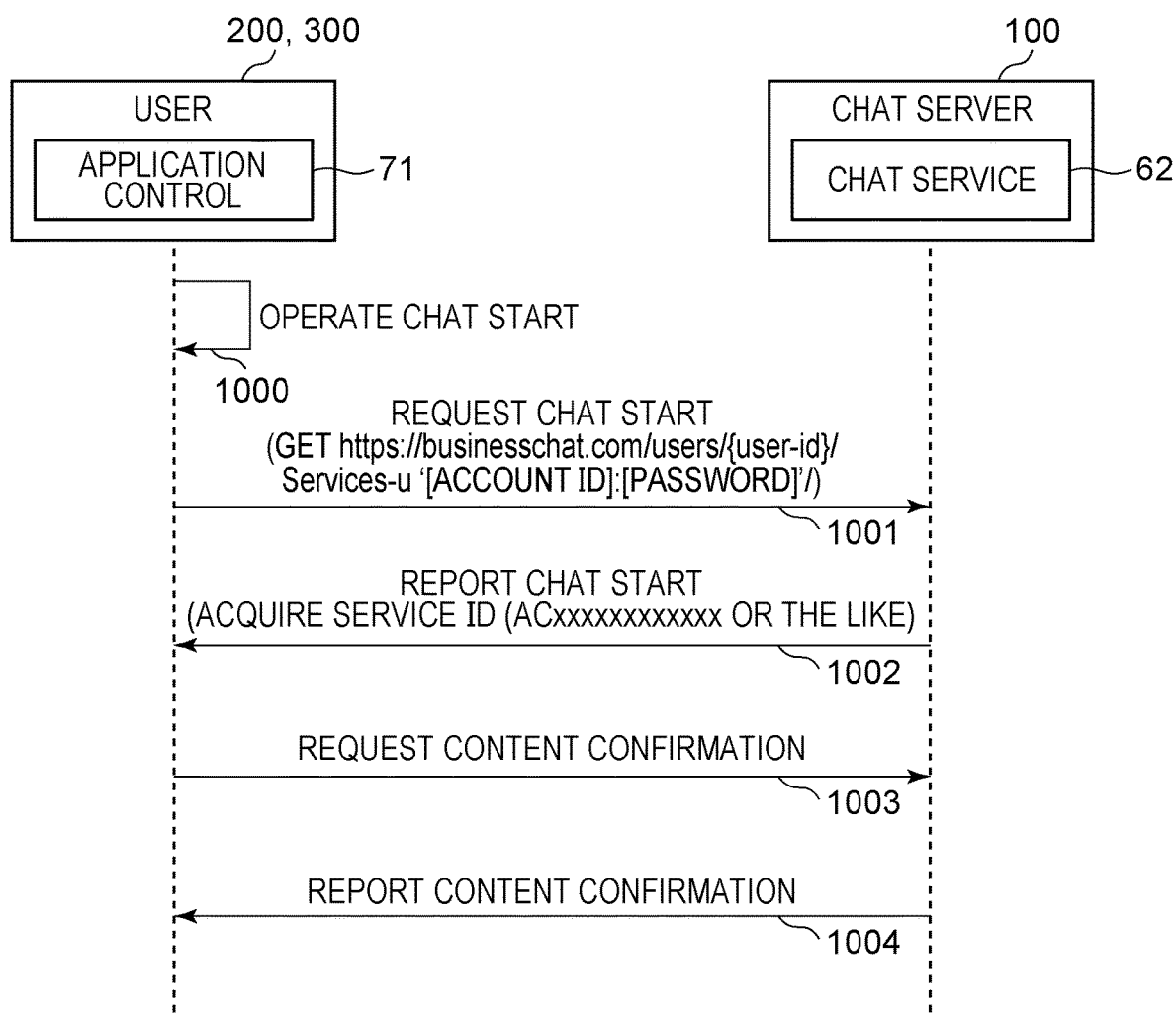
FIG. 11 is a sequence diagram showing an example of processing started by a chat start operation performed by a user.

FIG. 11 is a sequence diagram showing an example of processing that is performed when a chat start operation is performed by a user. This sequence is realized by the above-described CPUs of the respective apparatuses by loading a program from the above-described respective ROMs or the above-described storages into the above-described respective RAMs and executing the respective program. In process 1000, the user operates the operation unit 46 of the terminal (the mobile terminal 200 or the information processing terminal 300) to instruct the application control unit 71 to start communication with the chat application 65. When this communication is started, information necessary for the authentication in process 1001 in FIG. 11 is input via the operation unit 46.

Next, in process 1001, authentication of the user operating the mobile terminal 200 or the information processing terminal 300 for using the chat service 62 is performed between the chat server 100 and the mobile terminal 200 or the information processing terminal 300. More specifically, for the authentication, information for identifying the user who is authorized for the service (the user whose data is stored in the storage service 61) is described in [ACCOUNT ID] and [PASSWORD] and sent to the chat server 100 in a manner as exemplified in 1001 in FIG. 11.

While not illustrated, character strings that are set on a screen displayed on the operation unit 46 when the chat start operation is performed in process 1000 are input in [ACCOUNT ID] and [PASSWORD].

Next, the chat service 62 of the chat server 100 performs the authentication based on the character strings described in [ACCOUNT ID] and [PASSWORD]. When the authentication is successful, a service ID required for the subsequent services is returned to the application control unit 71 of the terminal operated by the user.

Next, in processes 1003 and 1004, the user acquires a list of contents that the user can use in the chat service 62 of the chat server 10, from the storage service 61, the chat service 62, and the BOT service 63. A result acquired here is displayed on a screen as shown in FIG. 7. D10 in FIG. 7 indicates the content of the chat service 62. D11 and D12 in FIG. 7 are information acquired from the storage service 61. The information acquired from the BOT service 63 is the same as that displayed on the BOT selection screen of FIG. 8.

With respect to the information acquired from the storage service 61, a unique ID is assigned to each of the chat, the user, the thread, the chat message, the group chat, and the channel shown in FIG. 6. Using these unique ID enables identification of chats and threads.

Figure 12:
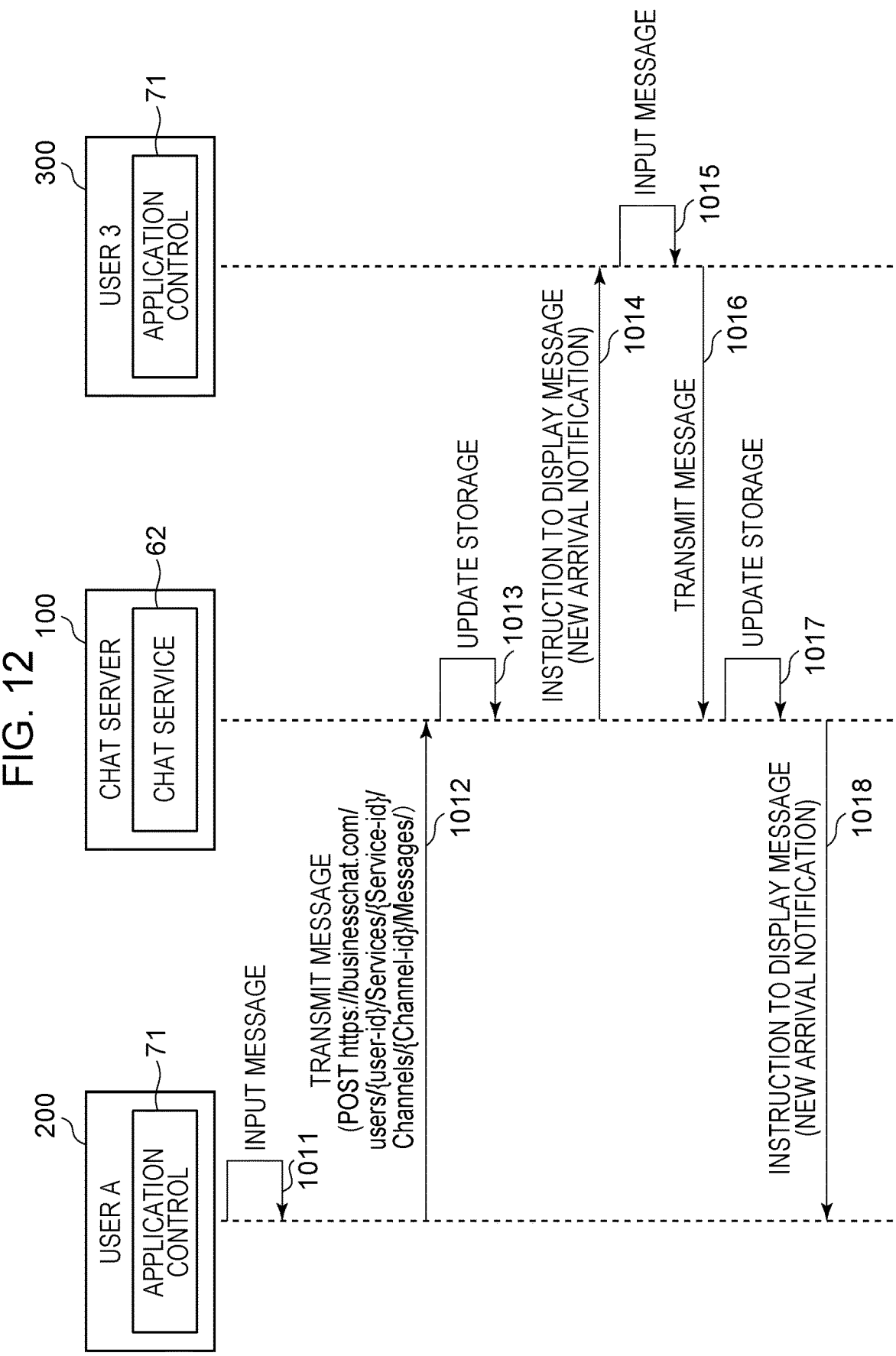
FIG. 12 is a sequence diagram showing an example of processing of exchanging chat messages.

FIG. 12 is a sequence diagram showing an example of processing of exchanging chat messages. This sequence is realized by the above-described CPUs of the respective apparatuses by loading a program from the above-described ROMs or the above-described storages into the above-described RAMs and executing the respective program. In FIG. 12, it is assumed that a user A and a user Z have both already passed the authentication for the chat service 62 of the chat server 100.

First, in process 1011, the user A inputs a chat message by operating the operation unit 46 of the mobile terminal 200 or the information processing terminal 300. Next, in process 1012, upon completion of inputting the chat message, the chat is transmitted to the chat application 65 of the chat service 62 of the chat server 100. Upon receiving this chat message, in process 1013, the chat application 65 of the chat service 62 of the chat server 100 updates the content of the user A 64 and the content of the user Z in the storage service 61 of the chat server 100.

When the updating is completed, in process 1014, a notification (a mention) is sent to the user Z who operates a terminal via the application control unit 71 of the mobile terminal 200 or the information processing terminal 300.

Next, in process 1015, a chat message is input by operating the operation unit 46. In process 1016, the chat message is transmitted to the chat application 65. In process 1017, the storage service 61 is updated. In process 1018, a notification (a mention) is sent to the other party of the chat. The chat messages exchanged in the above-described manner are displayed, for example, as in the chat message b and the chat message c shown in FIG. 7, on the operation unit 46.

Figure 13:
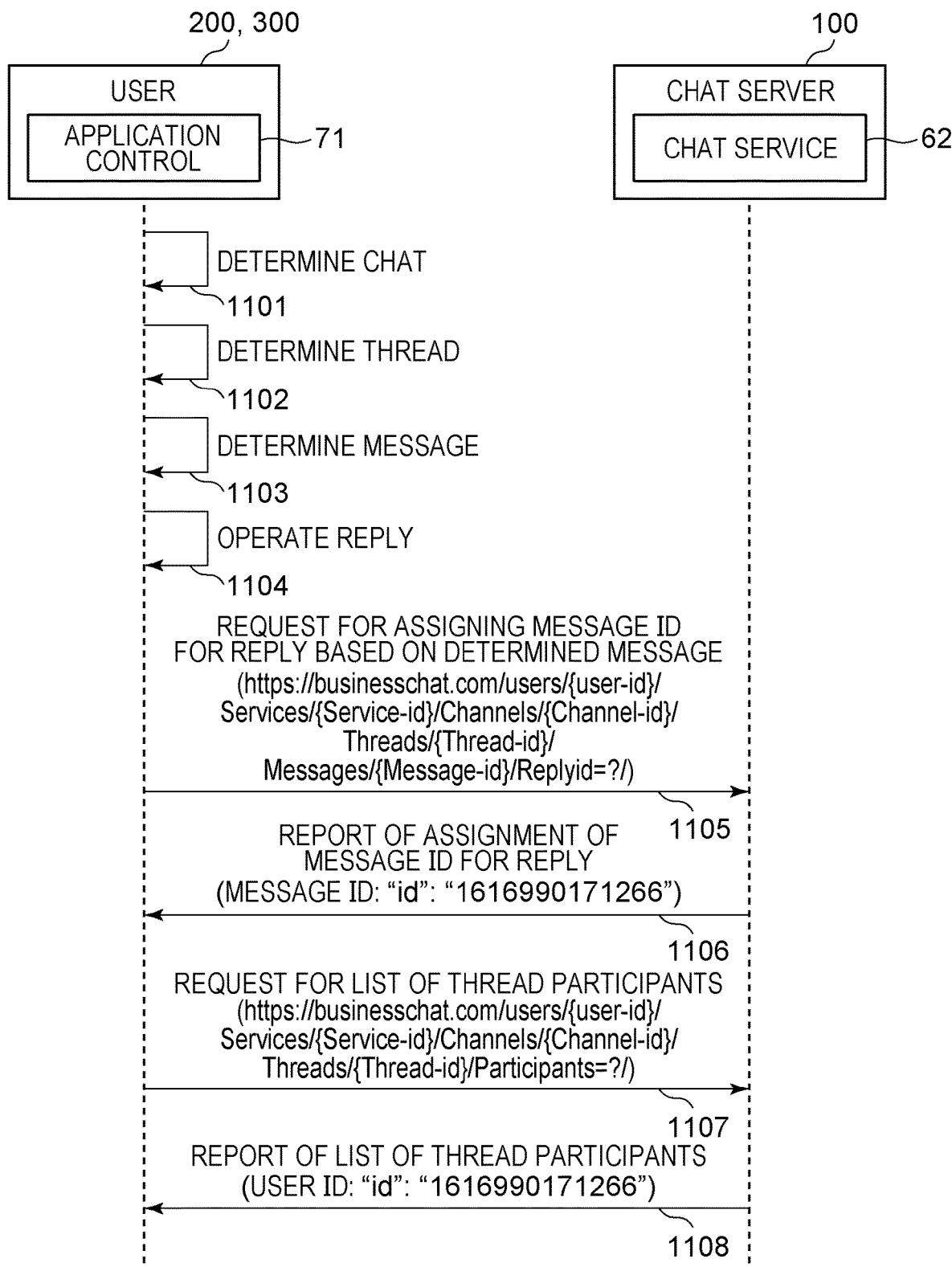
FIG. 13 is a sequence diagram showing an example of processing of replying to a specific chat message.

FIG. 13 is a sequence diagram showing an example of processing of replying to a specific chat message. This sequence is realized by the above-described CPUs of the respective apparatuses by loading a program from the above-described ROMs or the above-described storages into the above-described RAMs and executing the respective program. The processing shown in FIG. 13 corresponds to processing performed when the reply button D20 in FIG. 7 is operated.

First, in process 1101, a selection is accepted in terms of a chat room by a user via the application control unit 71 of the mobile terminal 200 or the information processing terminal 300. When a chat room is selected, a {Channel-id} value is determined, which identifies one of the one-to-one chat, the group chat, and others (the conference, the live event, etc.). In addition, users associated with each chat room are selected. The process 1101 corresponds to a selection operation D10 and a selection operation D11 shown in FIG. 7.

Next, in process 1102, a thread is selected. When a thread is selected, a {Thread-id} value is determined. In the example shown in FIG. 7, one of threads A, B, and C in D12 is selected.

Next, in process 1103, a chat message to be sent as the reply is selected. When a chat message is selected, a {Message-id} value is determined. This corresponds to the operation of selecting a particular chat message by operating the reply button D20 in FIG. 7.

When the chat, the channel, the thread, and the chat message are selected and determined, a unit ID is assigned to each of these as described above with reference to FIG. 6.

When the reply button D20 is operated at process 1104, message IDs for reply corresponding to specific messages are acquired in processes 1105 and 1106.

In the present embodiment, in process 1105, the application control unit 71 transmits, to the chat service 62, "https://businesschat.com/users/{user-id}/Services/{Service-id}/Channels/{Channel-id}/Threads/{Thread-id}/Messages/{Message-id}/Replyid=?/".

Next, in process 1106, the chat service 62 determines from "Replyid=?" that acquiring of a message ID for a reply is requested. Based on the unique IDs indicated by {user-id}, {Service-id}, {Channel-id}, {Thread-id}, and {Message-id}, the requested information is acquired from the chat server 100 and returned.

Note that {user-id} has the same value as [ACCOUNT ID] used in process 1001 in FIG. 11. {Service-id} indicates a value acquired in process 1002 in FIG. 11 from the chat server 100. {Channel-id}, {Thread-id}, and {Message-id} enables identification, in respective processes 1101, 1102, and 1103, of corresponding unique IDs in FIG. 6.

Next, in processes 1107 and 1108, a member list related to the selected message is acquired. The information collected in the above-described manner is stored in the mobile terminal 200 as chat information 2101 necessary for attaching a scanned image that will be described below with reference to FIG. 17.

Figure 14:
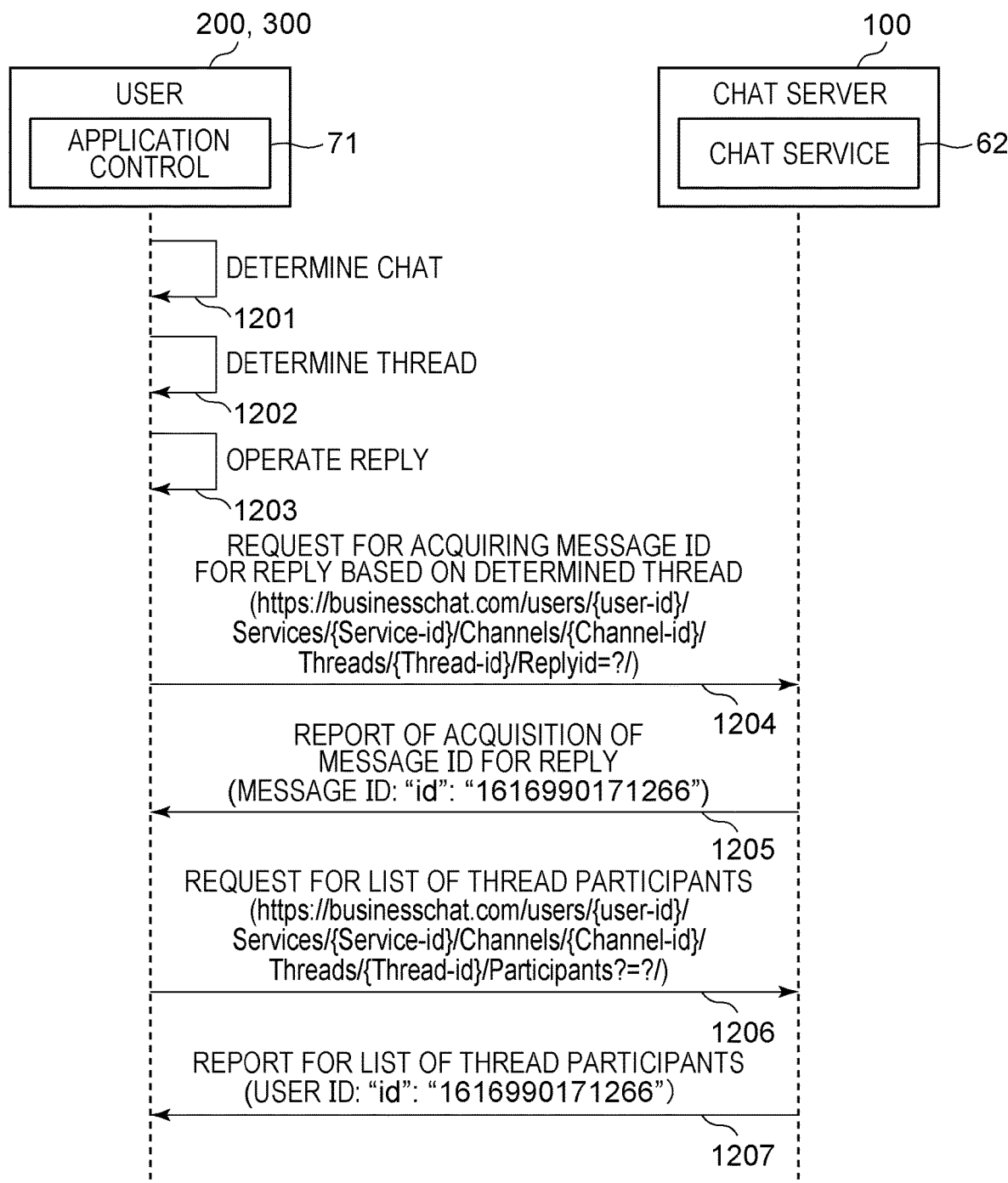
FIG. 14 is a sequence diagram showing an example of processing of selecting a thread and replying.

FIG. 14 is a sequence diagram showing an example of processing of selecting a thread and replying. This sequence is realized by the above-described CPUs of each apparatus by loading a program from the above-described ROMs or the above-described storages into the above-described RAMs and executing the respective program. Since processes in 1201 to 1203 are the same as those in 1101 to 1103 shown in FIG. 13, a duplicated description thereof is omitted herein.

In processes 1204 and 1205, a message ID for reply is acquired from the unique IDs determined in processes 1201 to 1203. These two processes 1204 and 1205 are respective the same as the processes 1105 and process 1106 in FIG. 13 except that {Message-id} does not exist.

In process 1206, the chat server 100 returns requested information based on {user-id}, {Service-id}, {Channel-id}, {Thread-id}, and {Message-id} acquired in process 1205.

Figure 15:
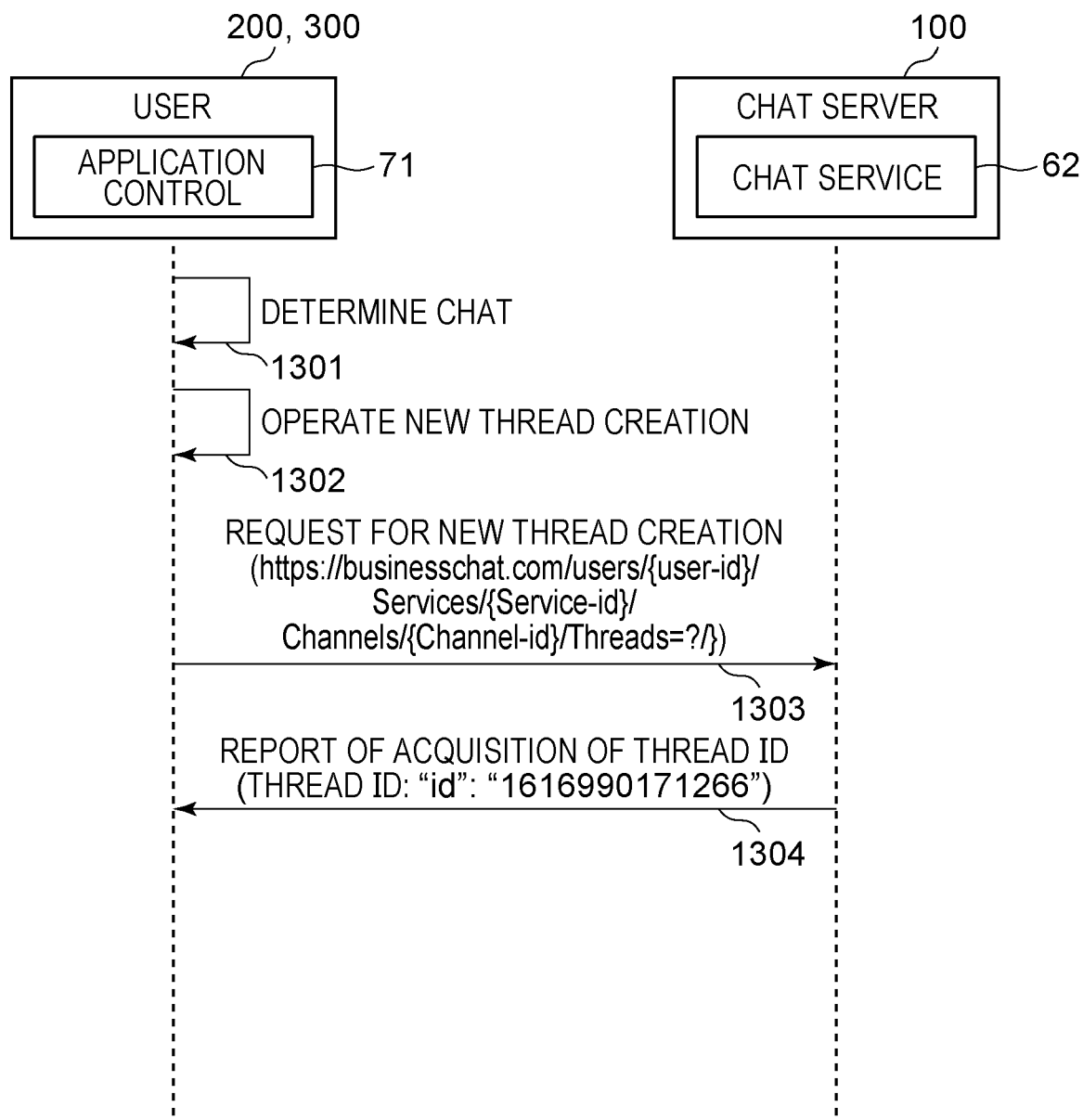
FIG. 15 is a sequence diagram showing an example of processing of creating a new thread and sending a chat message.

FIG. 15 is a sequence diagram showing an example of processing of creating a new thread and sending a chat message. This sequence is realized by the above-described CPUs of each apparatus by loading a program from the above-described ROMs or the above-described storages into the above-described RAMs and executing the respective program. The sequence in FIG. 15 corresponds to the process performed when the new thread creation button D40 in FIG. 7 is operated.

Process 1301 is the same as process 1101 in FIG. 13, and thus a description thereof is omitted herein. In process 1302, the mobile terminal 200 accepts a user selection of the new thread creation button D40 in FIG. 7.

Next, in process 1303, the mobile terminal 200 accesses "https://businesschat.com/users/{user-id}/Services/{Service-id}/Channels/{Channel-id}/Threads=?/" and instructs the chat server 100 to create a new thread. In the mobile terminal 200, the ID returned in process 1304 from the chat server 100 is processed as a reply message ID.

In the command in process 1303, businessschat.com is information that specifies the chat server 100, and "Threads=?" in the parameters indicates the creation of a new thread.

Figure 16A:
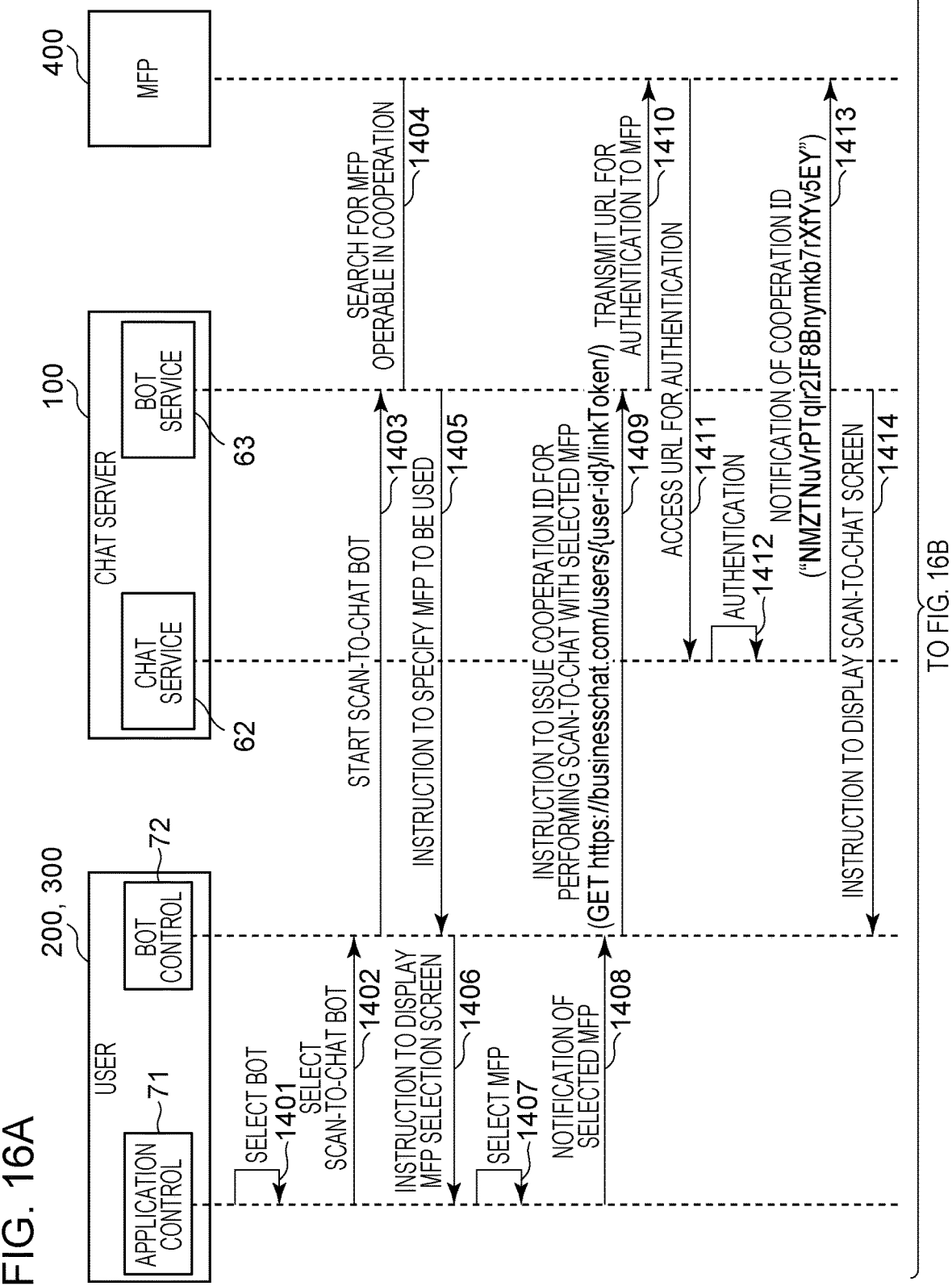

FIGS. 16A and 16B are a sequence diagram showing an example of a scan-to-chat process. In FIGS. 16A and 16B, it is assumed that the user has already passed the authentication for the chat service 62 of the chat server 100. In the sequence in FIGS. 16A and 16B, it is also assumed that the user has selected the reply button D20 and selected the BOT selection button to reply to the chat message c in the thread D12. The sequence in FIGS. 16A and 16B is realized by the above-described CPUs of each apparatus by loading a program from the above-described ROMs or the above-described storages into the above-described RAMs and executing the respective program.

In process 1401, under the control of the application control unit 71 of the mobile terminal 200, the user performs the BOT selection operation in the chat operation. More specifically, the mobile terminal 200 accepts the selection of a desired BOT application from the BOT applications displayed on the BOT selection screen D100 in FIG. 8. That is, the mobile terminal 200 accepts the selection of the scan-to-chat BOT D101 and the selection execution button D111.

Next, in process 1402, the application control unit 71 notifies the BOT control unit 72 of the mobile terminal 200 that the scan-to-chat BOT has been selected in the operation.

Next, in process 1403, the BOT control unit 72 instructs the BOT service 63 of the chat server 100 to start the scan-to-chat BOT.

Next, in process 1404, the BOT service 63 confirms that an MFP operable in cooperation exists on the network. The MFP operable in cooperation can be registered in the chat server 100 in advance, or can be dynamically searched for from, for example, a MIB (Management Information Base).

In the present embodiment, for security purposes, it is assumed that the MFP operable in cooperation is registered in advance, and in process 1404, it is checked whether the MFP can be used online or if it cannot be used because it is offline.

Next, in process 1405, the BOT service 63 of the chat server transmits a list of registered MFPs to the BOT control unit 72 of the mobile terminal 200.

In process 1406, the BOT control unit 72 of the mobile terminal 200 instructs the application control unit 71 to display the list of registered MFPs on the chat screen.

In process 1407, the user is prompted to specify an MFP to be used in the scanning from the displayed list of MFPs. More specifically, the mobile terminal 200 displays a list of registered MFPs as in the pull-down menu D201 in the scan-to-chat screen D200 in FIG. 9, and accepts a user selection.

When the MFP is selected, the application control unit 71 of the mobile terminal 200 notifies, in process 1408, the BOT control unit 72 of the information indicating the selected MFP.

Next, in process 1409, the BOT control unit 72 of the mobile terminal 200 instructs the BOT service 63 to issue a temporary cooperation key ("nonce") for enabling message transmission or file transmission from the MFP 400 to the chat server 100.

In process 1410, the BOT service 63 transmits to the MFP 400 an authentication URL necessary for issuing a temporary cooperation key.

In process 1411, the MFP 400 performs authentication processing on the chat service 62 of the chat server 100 by using the URL obtained in process 1410.

In process 1412, the chat service 62 of the chat server 100 determines, based on the expiration date of the authentication URL or the like, whether the authentication is valid. In a case where it is determined that the authentication is valid, the chat service 62 issues a temporary cooperation key in process 1413.

Next, at process 1414, the BOT service 63 of the chat server 100 instructs the BOT control unit 72 of the mobile terminal 200 to display the scan-to-chat screen D200.

Moving to FIG. 16B, in process 1415, the application control unit 71 of the mobile terminal 200 receives from the BOT control unit 72 the instruction to display the scan-to-chat screen D200, and displays the scan-to-chat screen D200. In process 1416, the application control unit 71 of the mobile terminal 200 accepts various settings from the user on the scan-to-chat screen D200, and waits for the scan execution button D211 to be selected.

When the scan execution button D211 is selected, the application control unit 71 transmits, in process 1417, an execution instruction to the BOT control unit 72. Next, in process 1418, the BOT control unit 72 transmits the scan-to-chat execution instruction and the setting information set on the scan-to-chat screen D200 to the BOT service 63 of the chat server 100.

In process 1419, the BOT service 63 of the chat server 100 transmits to the MFP 400 the execution instruction and the setting information received in process 1418. This setting information includes a scan setting (a reading setting), a mention destination, and thread information. This thread information is determined based on which thread corresponds to the reply button selected by the user on the chat screen D1 displayed on the mobile terminal 200. For example, in the example shown in FIG. 7, the reply button D20 in the thread D12 is selected by the user, and the thread information indicating the thread D12 is included in the setting information. The determination as to which thread information is incorporated in the setting information can be made by the BOT control unit 72 of the mobile terminal 200 or the BOT service 63 of the chat server 100.

In process 1420, the MFP 400 generates a scan job based on the setting information received in process 1419. Then, in process 1421, the MFP 400 executes the scan job in which an image of a document is read, and image data is generated. In process 1422, the MFP 400 converts the generated image data into the file format specified on the scan-to-chat screen D200.

Next, in process 1423, the MFP 400 transmits the image data to the chat service 62 of the chat server 100 using the temporary cooperation key acquired in process 1413. An instruction to upload the image data is also transmitted. Uploading of the image data to the thread is performed such that the image data is uploaded to the thread indicated by the thread information included in the setting information received in process 1419. That is, the upload instruction transmitted in process 1423 includes information specifying the thread. The information specifying the thread can be the thread information itself received in process 1419.

In the above-described example of the present embodiment, the thread information on the thread specified by the user is transmitted to the MFP 400, and the MFP 400 transmits an instruction for uploading image data to a thread indicated by the thread information, but the present disclosure is not limited to this example. In another exemplary embodiment, for example, the thread information specified by the user can be stored in the BOT service 63, and when the BOT service 63 of the chat server 100 receives from the MFP 400 the image data generated by the MFP 400, the BOT service 63 can upload the image data to the chat service 62. In this case, the thread to which the BOT service 63 uploads the image data is determined based on the thread information stored in the BOT service 63.

In process 1424, the chat service 62 of the chat server 100 stores the image data received from the MFP 400. Then, in process 1425, in response to uploading of the image data to the mobile terminal 200, the chat service 62 updates the chat screen D1 such that the chat screen D1 shown in FIG. 10 is displayed on the mobile terminal 200. In a case where the mention destination is set, the chat service 62 of the chat server 100 sends a notification to the terminal of the user specified as the mention destination.

In process 1427, in response to completion of the scan job executed by the MFP 400, the MFP 400 sends a scan job completion notification to the BOT service 63.

In process 1428, the BOT service 63 transmits information that instructs the closing of the scan-to-chat screen D200 to the BOT control unit 72 of the mobile terminal 200. Note that the scan-to-chat screen D200 can be closed when the scan execution button D211 is selected.

Figure 17:
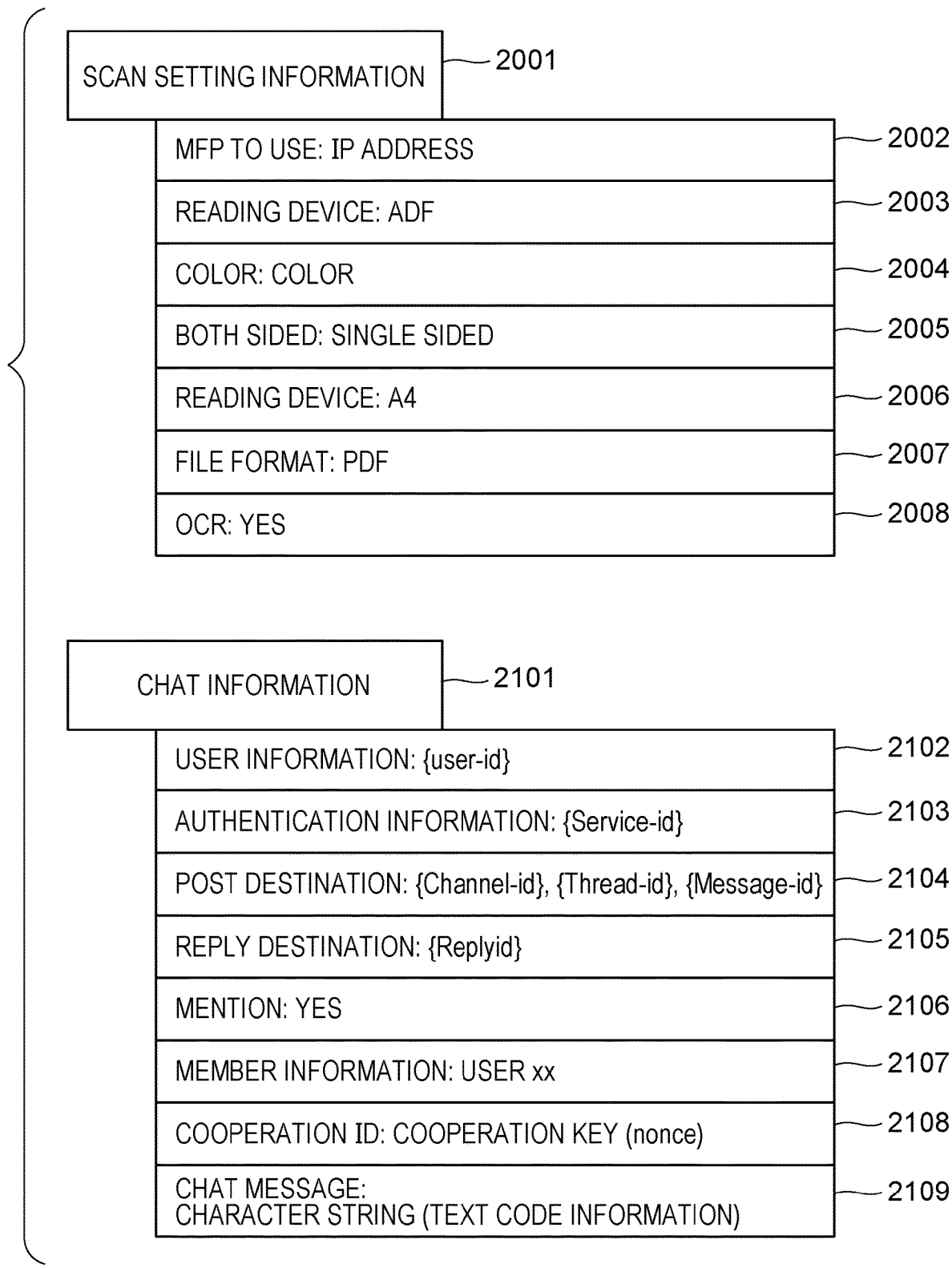
FIG. 17 is a diagram showing an example of information included in setting information.

FIG. 17 is a diagram showing an example of information included in the setting information. The setting information transmitted to the MFP 400 in process 1419 in FIG. 16 includes scan setting information (reading setting information) and chat information.

User setting information 2001 includes the information set on the scan-to-chat screen D200 in FIG. 9.

The scan setting information 2001 includes MFP information 2002, reading device information 2003, color information 2004, double-sided information 2005, reading size information 2006, file format information 2007, and OCR information 2008. Information 2002 to 2008 included in the scan setting information 2001 is information set in the pull-down menus D201 to 206 and D208 on the scan-to-chat screen D200.

The chat information 2101 includes user information 2102, authentication information 2103, posting destination information 2104, reply destination information 2105, mention information 2106, member information 2107, cooperation ID 2108, and a chat message 2109.

The user information 2102 is the [ACCOUNT ID] that is set in process 1001 in FIG. 11. That is, the user information 2102 is information related to a user who has instructed to execute the scan-to-chat process. The authentication information 2103 is a service ID returned in process 1002 in FIG. 11.

The posting destination information 2104 includes channel information {Channel-id} related to a channel corresponding to a thread for which the user has instructed to execute the scan-to-chat, thread information {Thread-id} related to this thread, and message information {Message-id} related to a message to be sent.

The reply destination information 2105 is an ID which is requested, for example, by "Replyid=?" in process 1105 in FIG. 13 and returned in process 1106 in response to the request in process 1105.

The mention information 2106 is information set by the pull-down menu D207. The member information 2107 is information indicating a user set as the destination of the mention by the pull-down menu D207.

The cooperation ID 2108 is a cooperation key including information called "nonce" that enables temporary use.

The chat message 2109 is a message based on character information acquired by executing a character recognition process on image data generated scanning, wherein the character recognition process is executed when it is specified, via the pull-down menu D208, to execute the OCR process. The OCR can be executed for just a partial area specified in advance by the user, or can be executed for the entire area.

Figure 18:
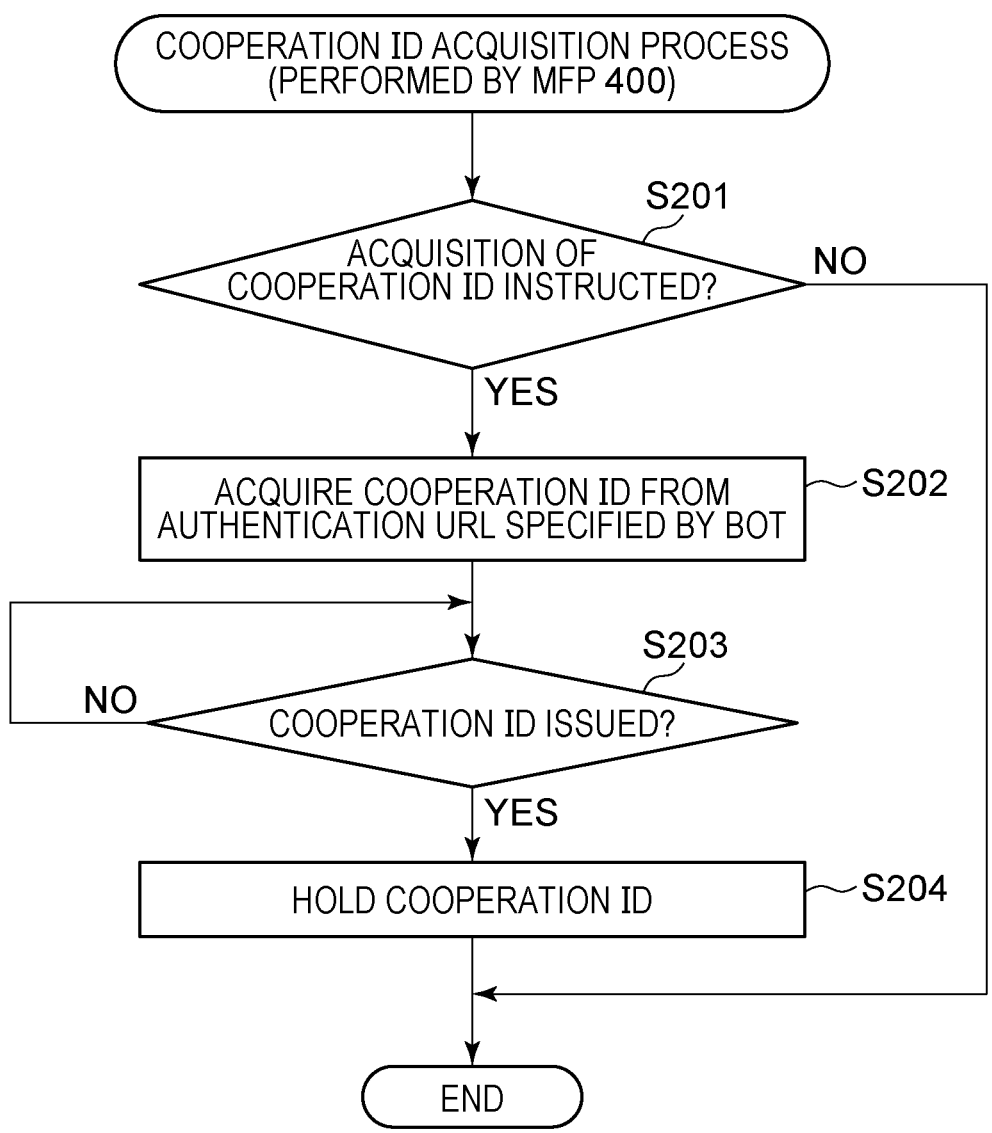
FIG. 18 is a flowchart showing an example of a process of acquiring a cooperation ID.

FIG. 18 is a flowchart showing an example of a process of acquiring a cooperation ID. This process is realized by the CPU 1 of the MFP 400 by loading a program from the ROM 2 or the storage 4 into the RAM 3 and executing the loaded program. This flow corresponds to a flow of acquiring a cooperation ID, "nonce", in processes 1409 to 1413 in FIG. 16.

In S201, the CPU 1 determines whether an instruction to acquire a cooperation key has been issued by the BOT service 63 of the chat server 100. In the present embodiment, the cooperation key can be obtained by accessing the authentication URL where the cooperation key is issued. If the instruction has issued, flow proceeds to S202. If the instruction has not issued, the process ends.

In S202, the CPU 1 instructs the chat service 62 to access the URL acquired in S201 and issue the requested cooperation key.

In S203, the chat service 62 confirms whether the authentication is valid, for example, based on the expiration date of the accessed authentication URL or the like. If the authentication is not valid, the CPU 1 waits in S203 for a temporary cooperation key to be issued. If the authentication is valid, the process proceeds to S204.

In S204, the CPU 1 stores the cooperation key issued by the chat service 62 as the cooperation ID 2108.

Figure 19:
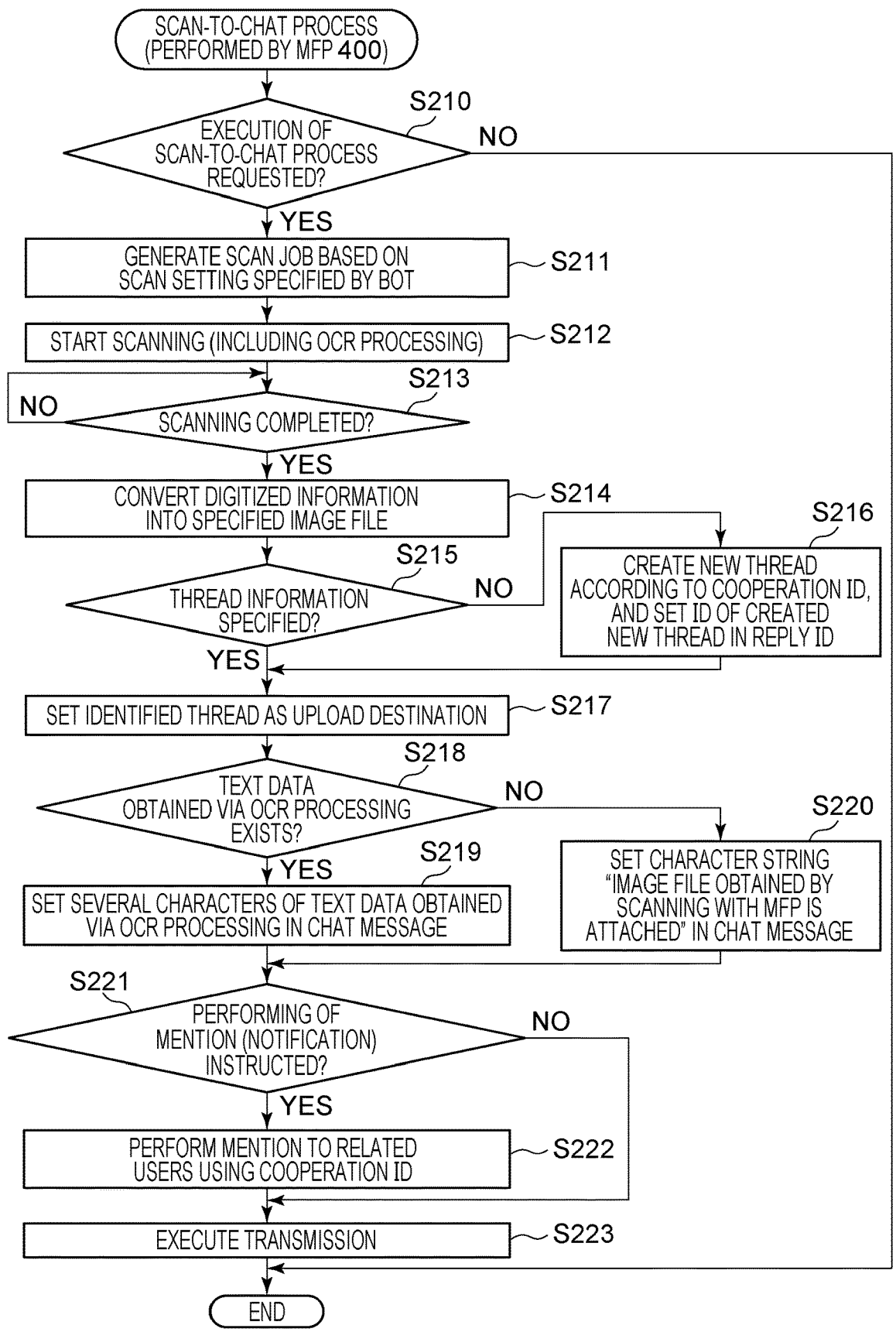
FIG. 19 is a flowchart showing an example of scan-to-chat processing.

FIG. 19 is a flowchart showing an example of a scan-to-chat process. This flow is realized by the CPU 1 of the MFP 400 by loading a program from the ROM 2 or the storage 4 into the RAM 3 and executing the loaded program. This flow corresponds to the processes 1419 to 1423 in FIG. 16. The processing shown in FIG. 19 is performed when the MFP 400 receives a scan instruction (a read instruction) and setting information from the BOT service 63 of the chat server (1419).

In S210, the CPU 1 confirms whether the scan-to-chat execution request has been received. The scan-to-chat execution request is transmitted from the BOT service 63 to the MFP 400 when the scan execution button D211 on the scan-to-chat screen D200 in FIG. 9 is selected. In a case where the execution request is received, the process proceeds to S211, otherwise the process ends.

In S211, the CPU 1 receives the execution request and the setting information in a JSON format or the like, and generates a scan job based on the setting information.

In S212, the CPU 1 controls the reading unit 8 to read the image of the document and generate the image data. The CPU 1 also executes OCR processing on the generated image data based on the OCR information included in the received setting information. In a case where the OCR information specifies that the OCR processing is not to be executed, the OCR processing is not executed.

In S213, the CPU 1 determines whether the scanning is completed. In a case where it is determined that the scanning is completed, the processing proceeds to S214, otherwise the process in S213 is repeated.

In S214, the CPU 1 converts the generated image data into a file format specified by the file format information included in the received setting information. In another exemplary embodiment, the process in S214 need not be executed.

In S215, it is determined whether a specific thread is specified based on the thread information included in the setting information received together with the execution request in S210. In the present embodiment, the above determination is made based on whether a NULL value is specified. In a case where the NULL value is specified, the processing proceeds to S216. If a value other than NULL is specified, the process proceeds to S217, where the thread specified by the thread information is determined as the upload destination of the image data. In S216 and S217, the CPU 1 generates a new thread based on cooperation ID and determines the new thread as the upload destination of the image data.

In S218, the CPU 1 determines whether there exists a character string obtained as a result of performing the OCR process. In a case where it is determined that such a character string exists, the processing proceeds to S219, otherwise the processing proceeds to S220.

In S219, the CPU 1 sets the character information acquired by executing the OCR process as a chat message.

In S220, the CPU 1 sets a fixed character string "an image file obtained by scanning with the MFP is attached" as a chat message. In another exemplary embodiment, a fixed character string need not be set.

In S221, the CPU 1 determines, based on the mention destination information included in the received setting information, whether a specific mention destination is specified. In a case where a specific mention destination is specified, the processing proceeds to S222, otherwise, the processing proceeds to S223.

In S222, based on the mention destination information, the CPU 1 sets a user (a mention destination) to whom a notification is to be sent when image data and a chat message are uploaded (posted).

In S223, the CPU 1 executes a transmission process such that the generated image data and the chat message are uploaded to the thread specified in the previous process, and the notification is transmitted to the specified mention destination.

In the example described above with reference to the flowcharts, it is assumed by way of example that specific thread information is specified. In addition to the thread information, the channel information indicating the channel and the message to be replied to are also specified, and the image data is posted based on the specified information.

By executing the above processing, the user can easily perform uploading such that image data is generated by reading an image of a document using the image processing apparatus and the resultant image data is uploaded to a desired thread.

Figure 20:
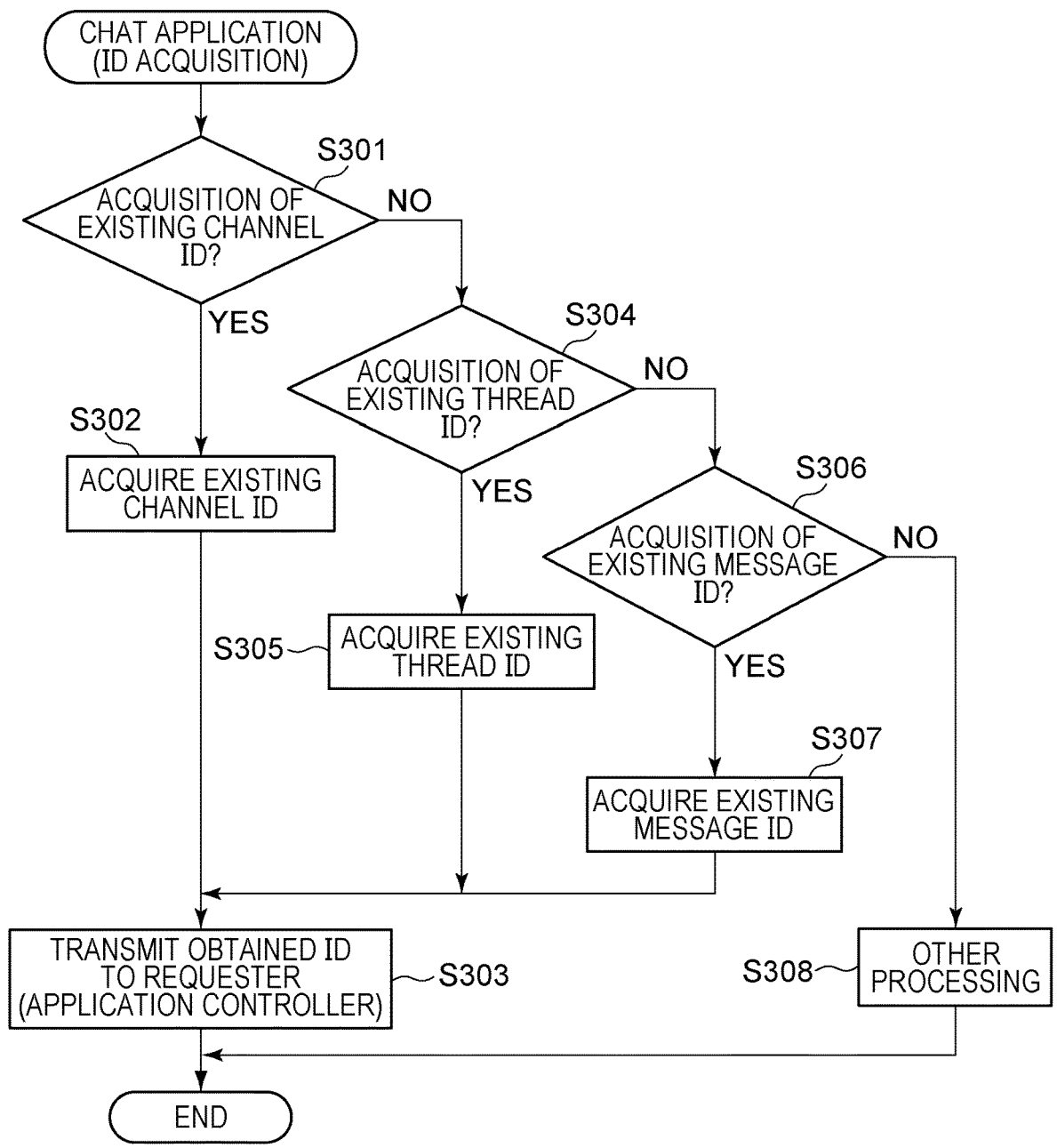
FIG. 20 is a flowchart showing an example of processing of acquiring unique IDs.

FIG. 20 is a flowchart showing an example of processing of acquiring unique IDs. This flow shown in FIG. 20 is realized by the CPU 21 of the chat server 100 by loading a program from the ROM 22 or the storage 24 into the RAM 23 and executing the loaded program.

In S301, the CPU 21 confirms whether acquisition of a channel ID is requested. In a case where a channel ID acquisition is requested, the processing proceeds to S302, otherwise the processing proceeds to S304.

In S302, the CPU 21 acquires the channel ID. In S304, the CPU 21 determines whether acquiring of a thread ID is requested. In a case where acquiring of a thread ID is requested, the processing proceeds to S305, otherwise the processing proceeds to S306.

In S305, the CPU 21 acquires the thread ID. In S306, the CPU 21 determines whether acquiring of a message ID is requested. In a case where acquiring of a message ID is requested, the processing proceeds to S307, otherwise, the processing proceeds to S308 in which the CPU 21 executes other processing.

In S307, the CPU 21 acquires the message ID. In S303, the CPU 21 transmits the acquired ID to the application control unit 71.

Figure 21:
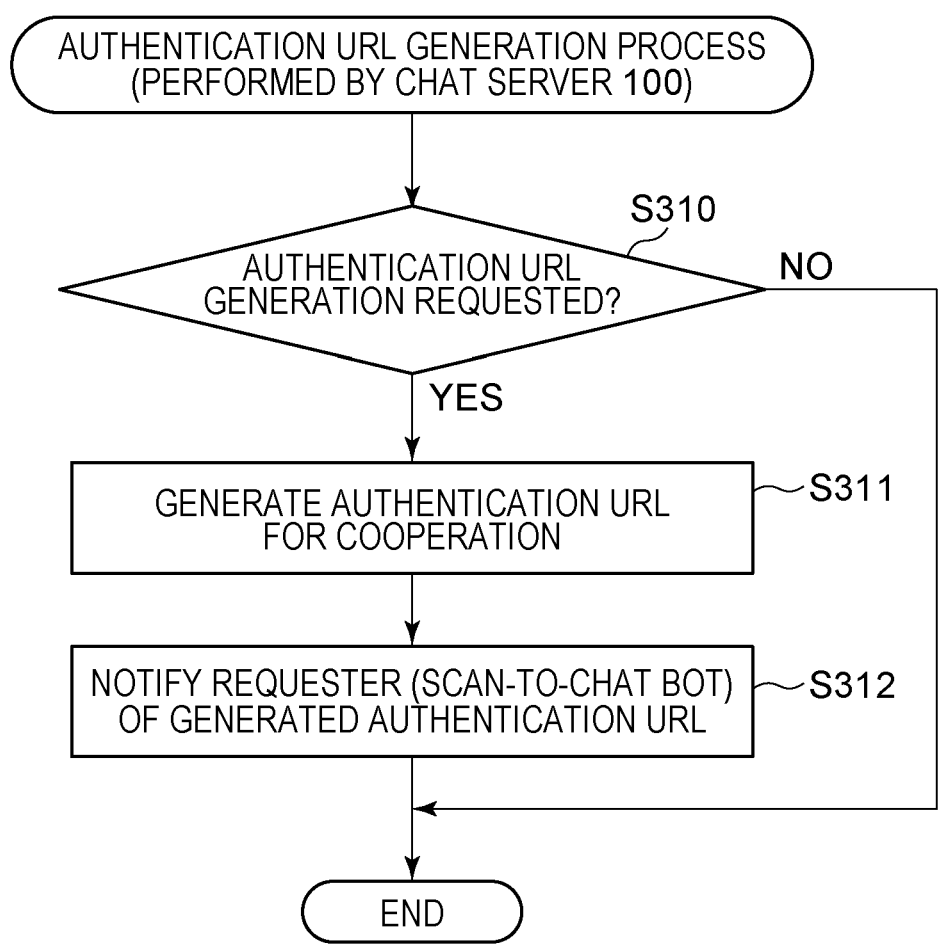
FIG. 21 is a flowchart showing an example of authentication URL generation processing.

FIG. 21 is a flowchart showing an example of authentication URL generation processing. This flow is realized by the CPU 21 of the chat server 100 by loading a program from the ROM 22 or the storage 24 into the RAM 23 and executing the loaded program. In S310, it is confirmed whether generating of an authentication URL is requested. In a case where it is determined in S310 that generating of an authentication URL is requested, the processing proceeds to S311, otherwise the processing ends. In S311, a URL for authentication required for obtaining a cooperation ID is generated. In S312, the generated authentication URL is returned to a requester of this request.

Figure 22:
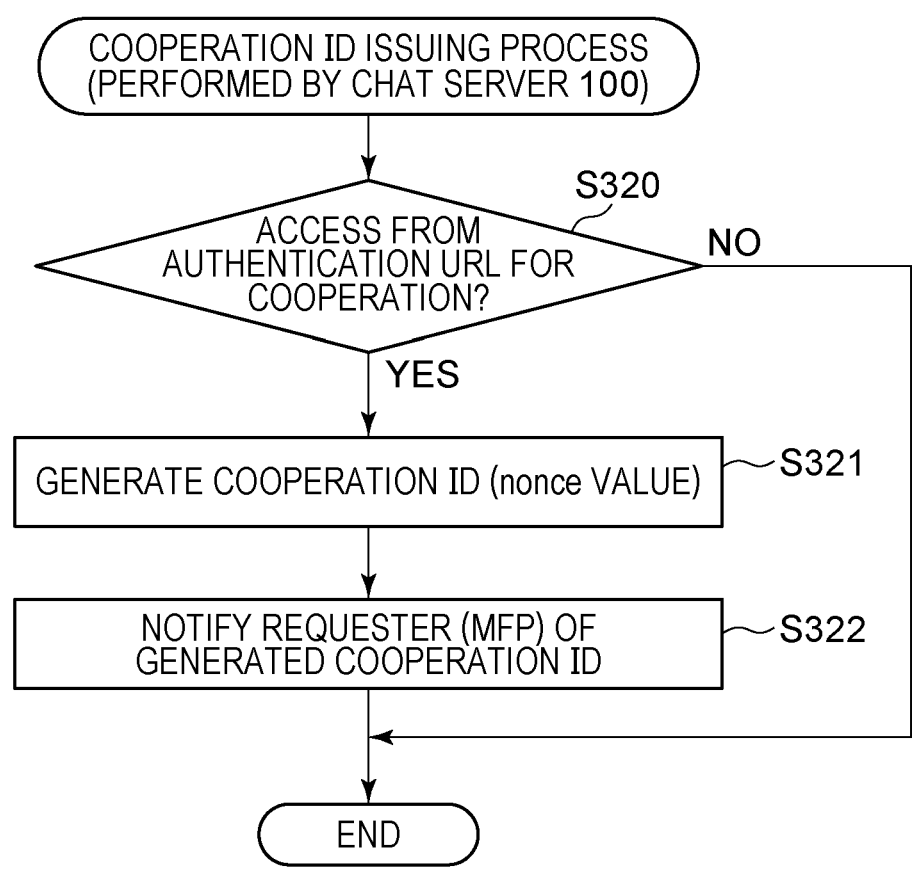
FIG. 22 is a flowchart showing an example of processing of issuing a cooperation ID.

FIG. 22 is a flowchart showing an example of processing of issuing a cooperation ID. This flow is realized by the CPU 21 of the chat server 100 by loading a program from the ROM 22 or the storage 24 into the RAM 23 and executing the loaded program. In S320, it is confirmed whether the request is from the authentication URL generated in S311 in FIG. 21. In a case where the request is from the authentication URL, the processing proceeds to S321, otherwise the processing ends. In S321, a cooperation ID is generated, and in S322 the generated cooperation ID is returned to a requester of this request.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-156315, filed Sep. 27, 2021, which is hereby incorporated by reference herein in its entirety.

What is claimed is:

1. An image processing apparatus comprising:
   a scanner that scans an image of a document to generate image data; and
   a communicator that transmits the image data,
   wherein the communicator receives an instruction and information of a thread specified by a user via a terminal apparatus connected to a server related to a chat service from the server, the thread being one of a plurality of threads included in a chat room of the chat service,
   wherein, based on the received instruction, the scanner scans the image of the document to generate the image data and the communicator transmits the generated image data to the server,
   wherein the image data transmitted by the communicator is posted to the thread included in the chat room, the thread corresponding to the information,
   wherein the communicator transmits the generated image data to the server such that the generated image data is posted to the thread included in the chat room, the thread corresponding to the information, and
   wherein if the communicator receives the instruction without receiving the information, the communicator transmits the image data to the server such that the generated image data is posted to a newly created thread.

2. The image processing apparatus according to claim 1, wherein the communicator receives, from the server, the information of the specified thread in a state where a screen of the chat room is displayed on a display of the terminal apparatus connected to the server.

3. The image processing apparatus according to claim 1, wherein the communicator receives, from the server, a scanning setting in a state where a screen of the chat room is displayed on a display of the terminal apparatus connected to the server.

4. The image processing apparatus according to claim 3, wherein, based on the received scanning setting, the scanner scans an image of the document to generate the image data and the communicator transmits the generated image data to the server such that the generated image data is posted to the thread included in the chat room, the thread corresponding to the received information.

5. The image processing apparatus according to claim 1, wherein the communicator transmits, to the server, the generated image data and a message based on character information acquired by executing a character recognition process on the generated image data.

6. The image processing apparatus according to claim 1,
   wherein the instruction and the information of the thread specified by the user are transmitted by a bot service installed in the server and then the communicator receives the instruction and the information of the thread specified by the user, and
   wherein the thread is specified based on selection, by the user, of an object of the bot service, the object being displayed in the thread.

7. An image processing method comprising:
   scanning an image of a document to generate image data;
   transmitting the image data; and
   receiving an instruction and information of a thread specified by a user via a terminal apparatus connected to a server related to a chat service from the server, the thread being one of a plurality of threads included in a chat room of the chat service,
   wherein, based on the received instruction, the image of the document is scanned, the image data is generated and the generated image data is transmitted to the server,
   wherein the transmitted image data is posted to a thread included in the chat room, the thread corresponding to the information,
   wherein the generated image data is transmitted to the server such that the generated image data is posted to the thread included in the chat room, the thread corresponding to the information, and
   wherein if the instruction is received without the information, the image data is transmitted to the server such that the generated image data is posted to a newly created thread.

8. A non-transitory computer-readable storage medium storing a program causing a server related to a chat service to execute a method, the method comprising:
   determining, based on a selection by a user, a thread that is one of a plurality of threads included in a chat room of the chat service;
   transmitting, to an image processing apparatus, an instruction and information of a thread specified by a user via a terminal apparatus connected to the server;
   receiving, from the image processing apparatus, image data generated by the image processing apparatus by scanning an image of a document based on the transmitted instruction; and
   posting the received image data to the determined thread,
   wherein in a case where the instruction is transmitted to the image processing apparatus without determining the thread, the received image data is posted to a newly created thread.

9. The storage medium according to claim 8, wherein the image data is posted to the thread specified in a state where a screen of the chat room is displayed on a display of a terminal apparatus connected to the server.

10. The storage medium according to claim 8, wherein a reading setting, specified in a state where a screen of the chat room is displayed on a display of a terminal apparatus connected to the server, is transmitted to the image processing apparatus.

11. The storage medium according to claim 10, wherein the image data generated by scanning an image of the document based on the transmitted scanning setting is received.

12. The storage medium according to claim 8,
wherein the instruction and the information of the thread specified by the user are transmitted by a bot service installed in the server, and
wherein the thread is specified based on selection, by the user, of an object of the bot service, the object being displayed in the thread.

\* \* \* \* \*